United States Patent
Okuyama et al.

(10) Patent No.: US 10,896,241 B2
(45) Date of Patent: Jan. 19, 2021

(54) INFORMATION PROCESSING DEVICE AND CONTROL METHOD THEREFOR

(71) Applicant: HITACHI, LTD., Tokyo (JP)

(72) Inventors: Takuya Okuyama, Tokyo (JP); Masanao Yamaoka, Tokyo (JP); Chihiro Yoshimura, Tokyo (JP); Masato Hayashi, Tokyo (JP); Akihito Akai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 615 days.

(21) Appl. No.: 15/735,033

(22) PCT Filed: Jun. 9, 2015

(86) PCT No.: PCT/JP2015/066581
§ 371 (c)(1),
(2) Date: Dec. 8, 2017

(87) PCT Pub. No.: WO2016/199220
PCT Pub. Date: Dec. 15, 2016

(65) Prior Publication Data
US 2018/0300287 A1    Oct. 18, 2018

(51) Int. Cl.
*G06F 17/10* (2006.01)
*G06F 7/00* (2006.01)
(Continued)

(52) U.S. Cl.
CPC ............ *G06F 17/10* (2013.01); *G06F 7/00* (2013.01); *G06F 15/173* (2013.01); *G06F 15/76* (2013.01);
(Continued)

(58) Field of Classification Search
CPC .......... G06F 17/10; G06F 7/00; G06F 15/173; G06F 15/76; H04L 9/0852; G06N 5/003
See application file for complete search history.

(56) References Cited

U.S. PATENT DOCUMENTS

2006/0225165 A1    10/2006  Maassen van den Brink et al.
2015/0032994 A1*    1/2015  Chudak .................. G06N 10/00
                                                                712/42

FOREIGN PATENT DOCUMENTS

JP    2008-525873 A1    7/2008
JP    2012-217518 A    11/2012

OTHER PUBLICATIONS

Block, Benjamin, Peter Virnau, and Tobias Preis. "Multi-GPU accelerated multi-spin Monte Carlo simulations of the 2D Ising model." Computer Physics Communications 181.9 (2010): 1549-1556. (Year: 2010).*

(Continued)

*Primary Examiner* — Omar F Fernandez Rivas
*Assistant Examiner* — Joshua E. Jensen
(74) *Attorney, Agent, or Firm* — Volpe Koenig

(57) ABSTRACT

An information processing apparatus manufactured at low cost and with ease and that is capable of making a search for a ground state of an arbitrary Ising model. An information processing unit containing a plurality of semiconductor chips, each retains a value of one spin or values of a plurality of spins and simulates interactions among the spins, interchip wiring between the necessary semiconductor chips, and a control unit that cause each semiconductor chip to perform interaction computation. The control unit converts data of a problem into data of a lattice-shaped Ising model, which is possibly expressed by the plurality of semiconductor chips, without causing a spin arrangement, in a ground state of an Ising model for the problem, to be changed. The data of the lattice-shaped Ising model is divided for allocation to the plurality of semiconductor chips, and causes each semiconductor chip to perform the interaction computation.

8 Claims, 20 Drawing Sheets

(51) Int. Cl.
G06F 15/173 (2006.01)
H04L 9/08 (2006.01)
G06F 15/76 (2006.01)
G06N 5/00 (2006.01)
G06N 10/00 (2019.01)

(52) U.S. Cl.
CPC ........... *G06N 5/003* (2013.01); *H04L 9/0852* (2013.01); *G06N 10/00* (2019.01)

(56) References Cited

OTHER PUBLICATIONS

Regge, Tullio, and Riccardo Zecchina. "Combinatorial and topological approach to the 3D Ising model." Journal of Physics A: Mathematical and General 33.4 (2000): 741. (Year: 2000).*

Plischke, M., and D. Zobin. "Renormalisation group calculations for two dimensional disordered Ising models." Journal of Physics C: Solid State Physics 10.22 (1977): 4571. (Year: 1977).*

Yamaoka, Masanao, et al. "A 20k-spin Ising chip to solve combinatorial optimization problems with CMOS annealing." IEEE Journal of Solid-State Circuits 51.1 (2015): 303-309. (Year: 2015).*

Yoshimura, Chihiro, et al. "Spatial computing architecture using randomness of memory cell stability under voltage control." 2013 European Conference on Circuit Theory and Design (ECCTD). IEEE, 2013. (Year: 2013).*

Vicky Choi, Minor-Embedding in Adiabatic Quantum Computation: I. The Parameter Setting Problem, D-Wave Systems, Inc., pp. 17, Apr. 30, 2008.

Vicky Choi, Minor-embedding in adiabatic quantum computation: II. Minor-universal graph design, Department of Computer Science, Virginia Tech, pp. 10, Jan. 2010.

* cited by examiner

[Fig. 1]
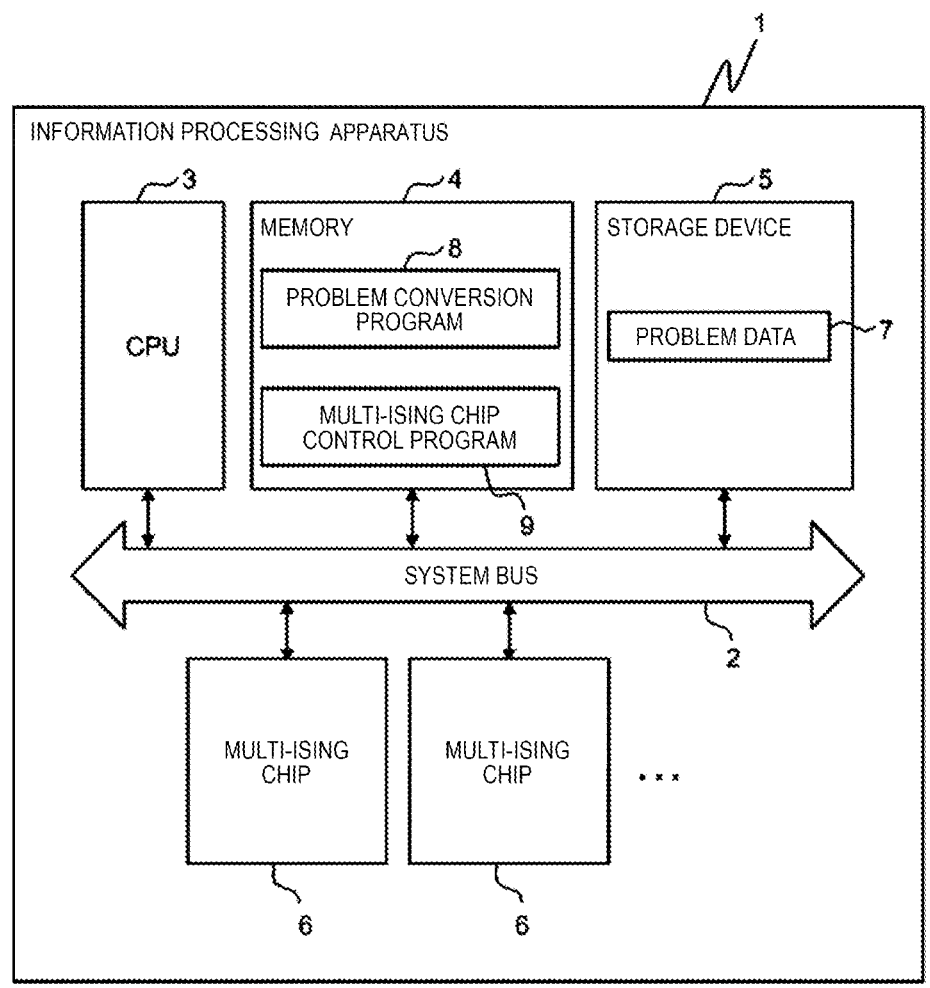

[Fig. 2]
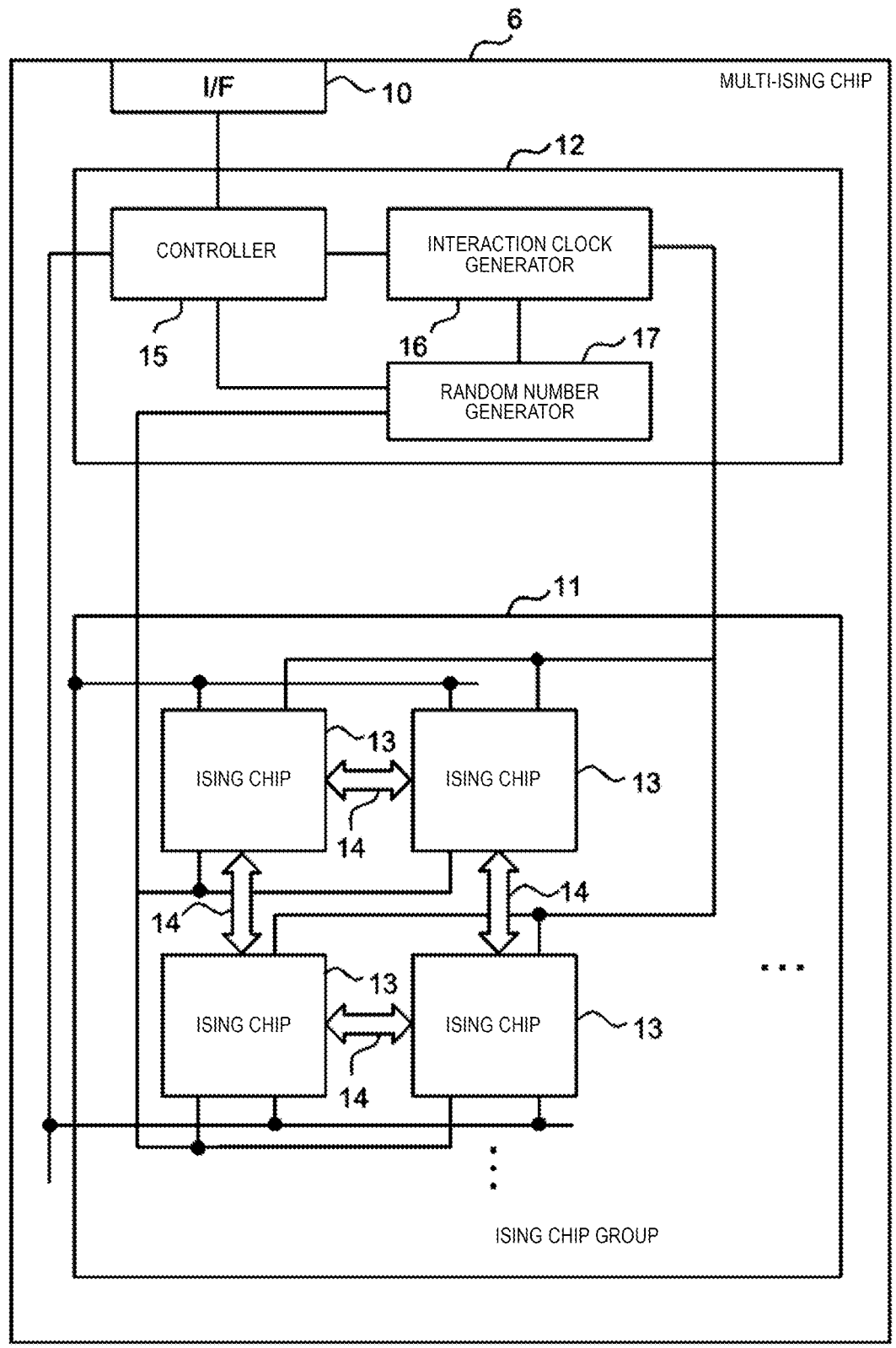

[Fig. 3]
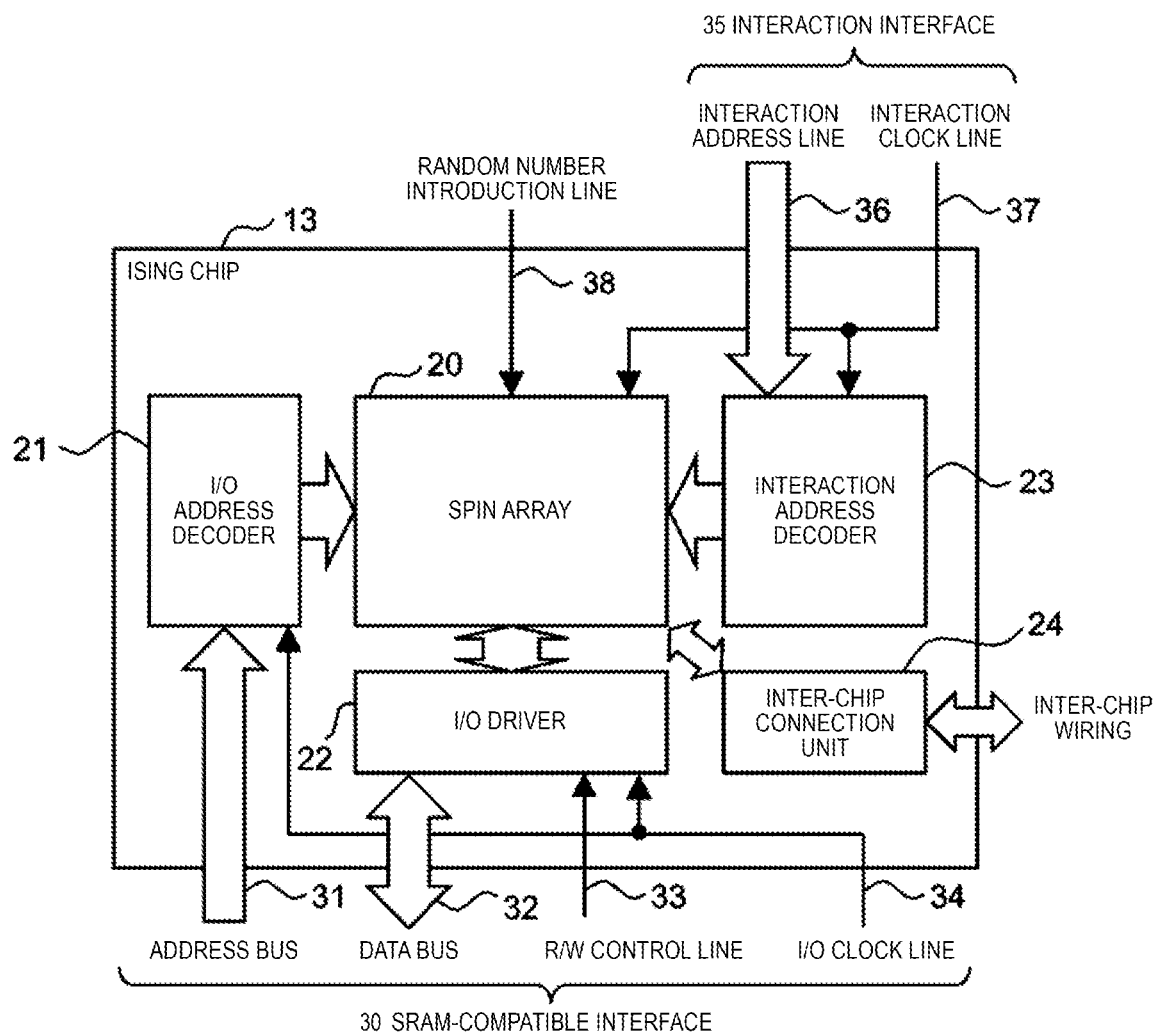

[Fig. 4]
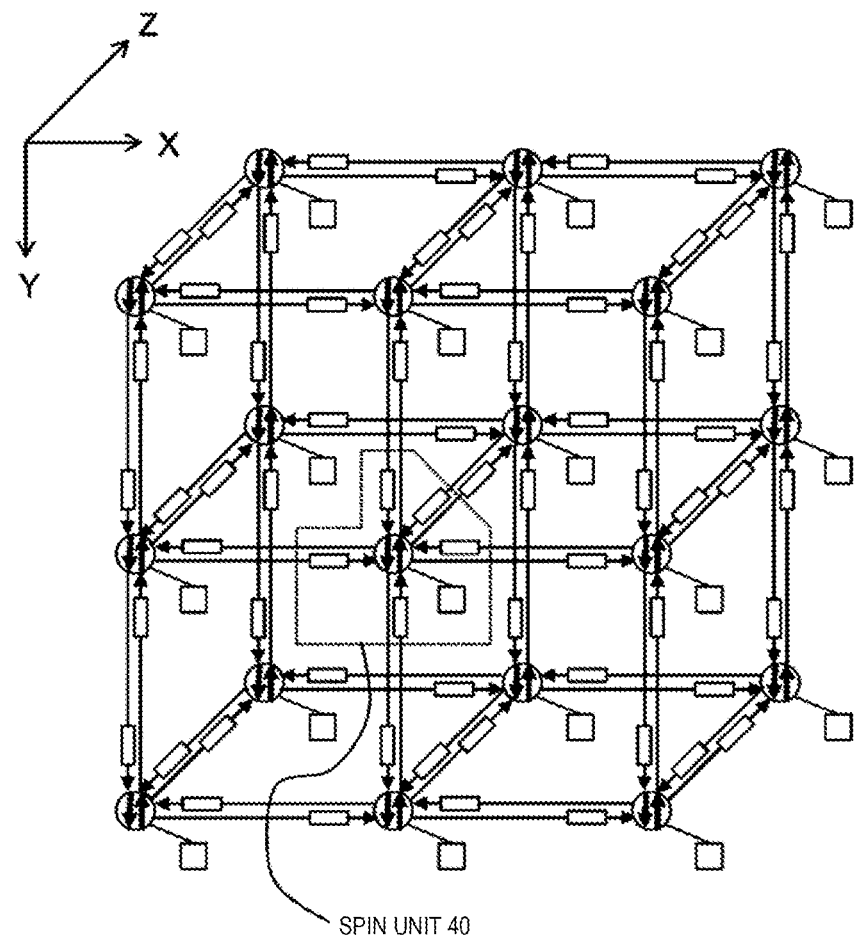
SPIN UNIT 40
- SPIN
- INTERACTION COEFFICIENT
- EXTERNAL MAGNETIC FIELD COEFFICIENT

[Fig. 5]
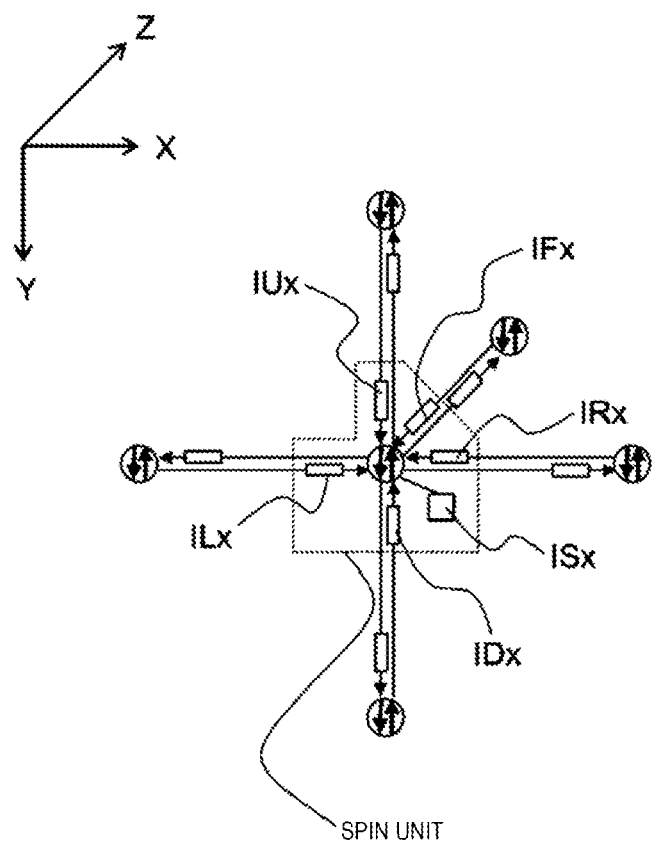

[Fig. 6]
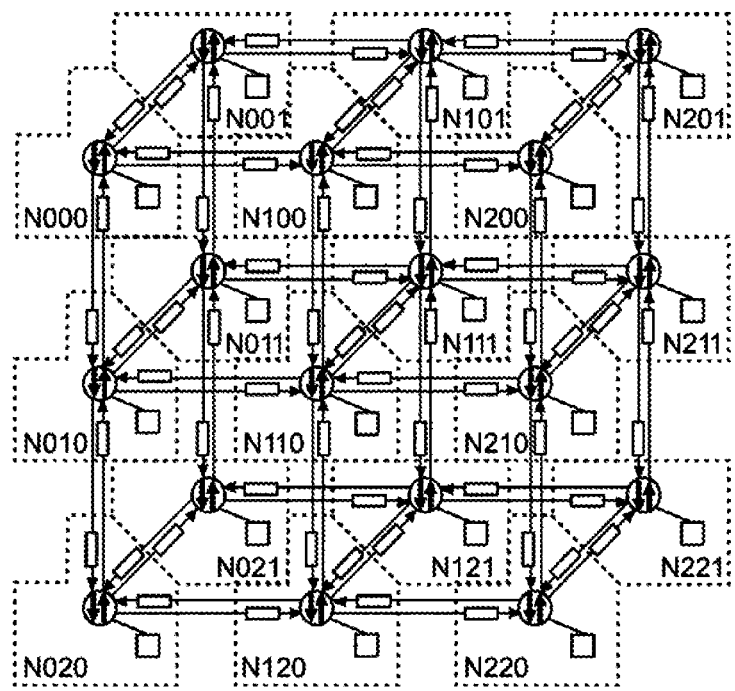

[Fig. 7]
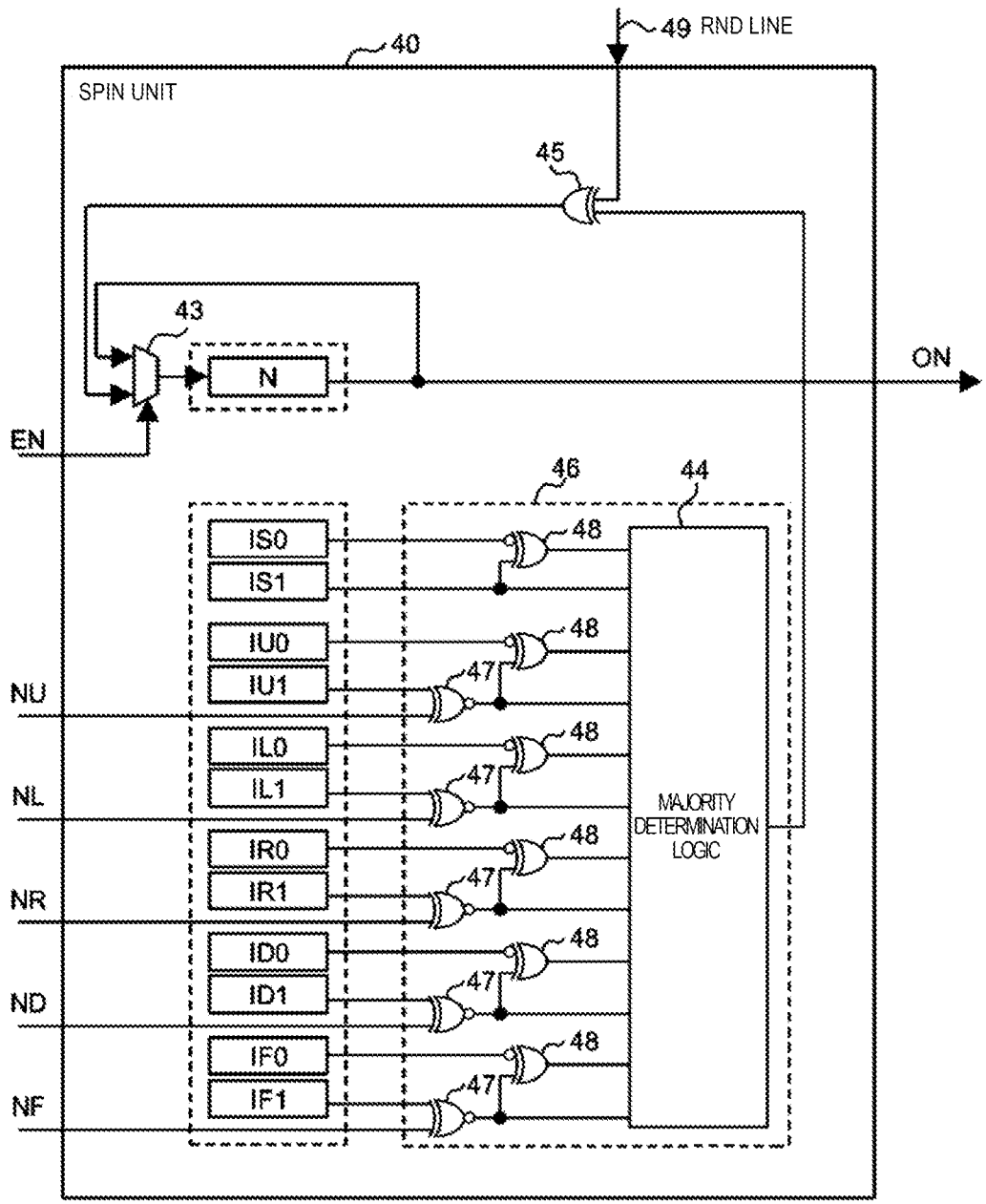

[Fig. 8]
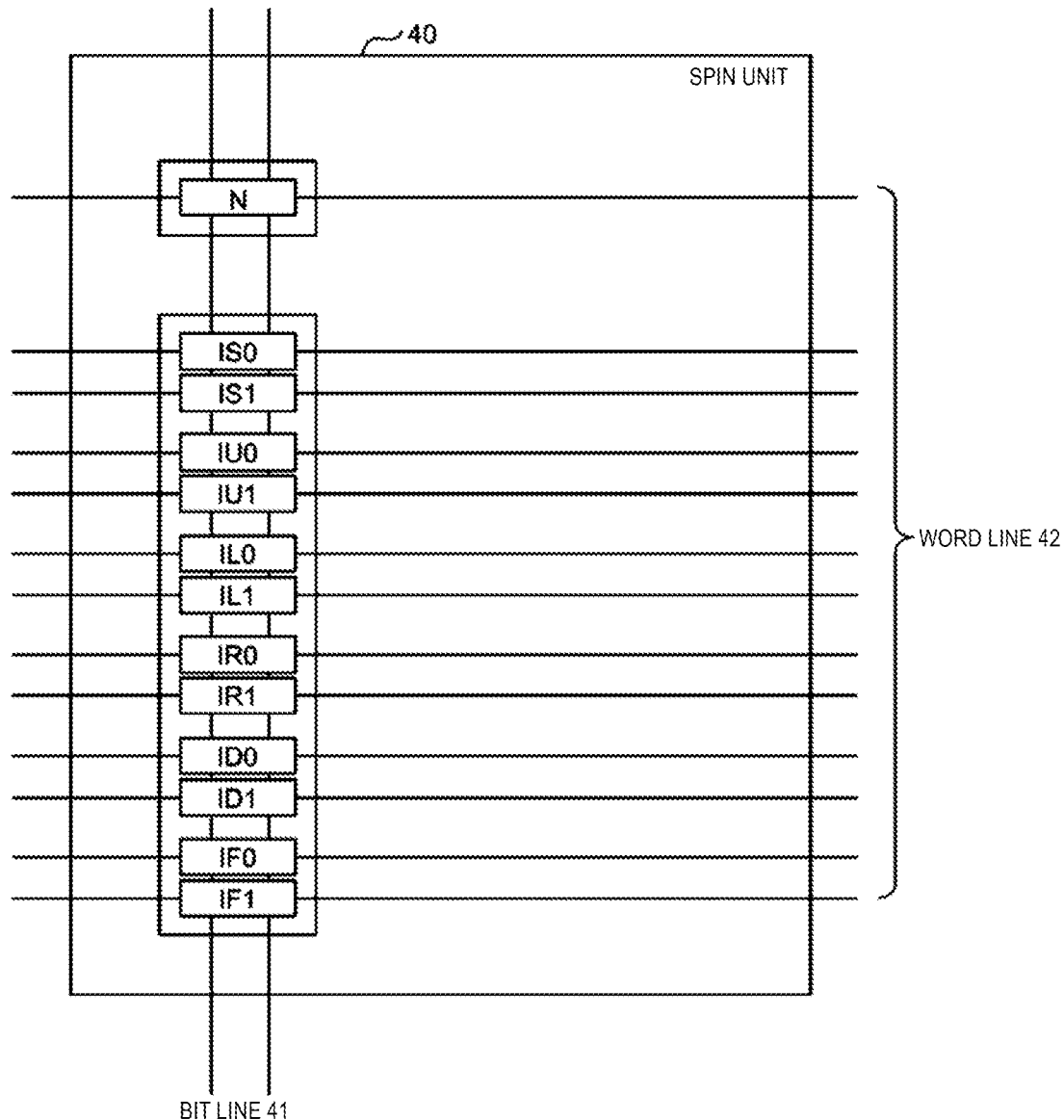

[Fig. 9]
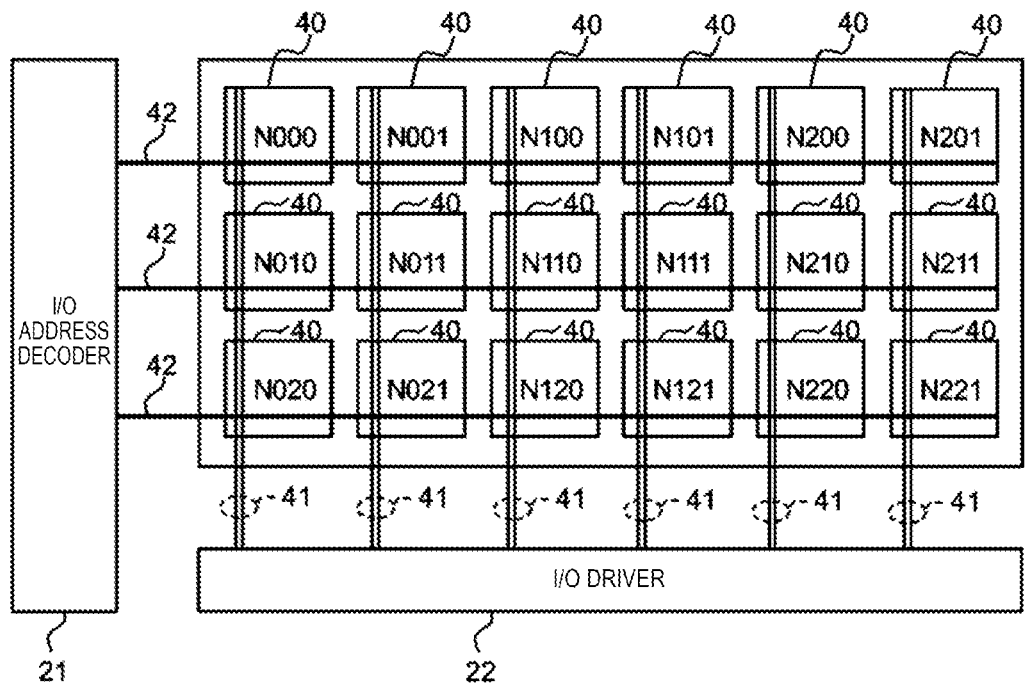

[Fig. 10]
(A) 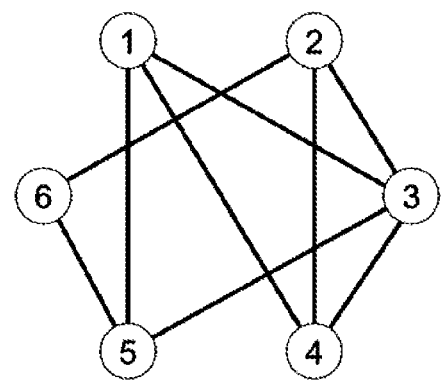
(B) 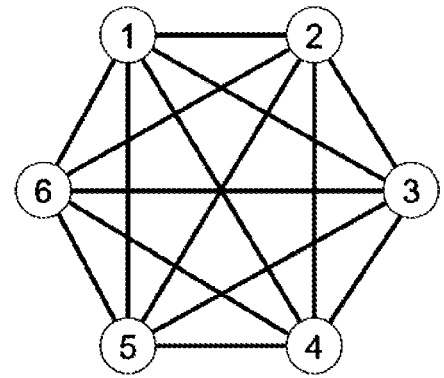

[Fig. 11]
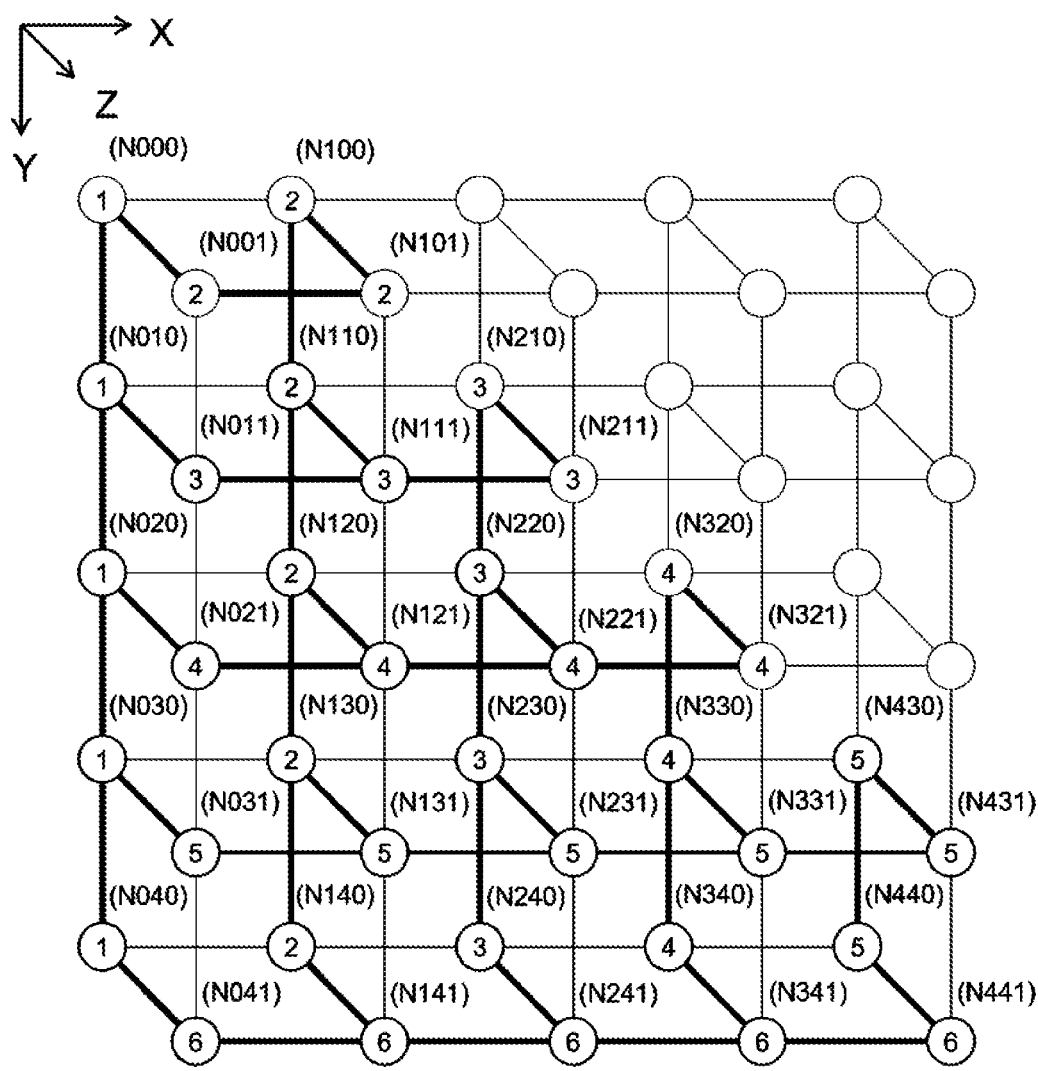

[Fig. 12]
(A) 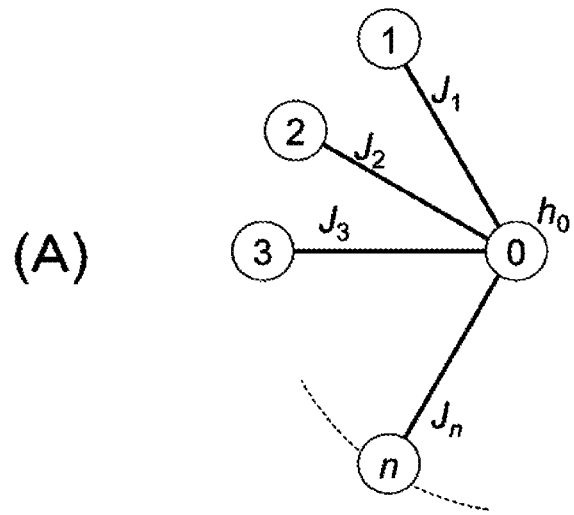
(B) 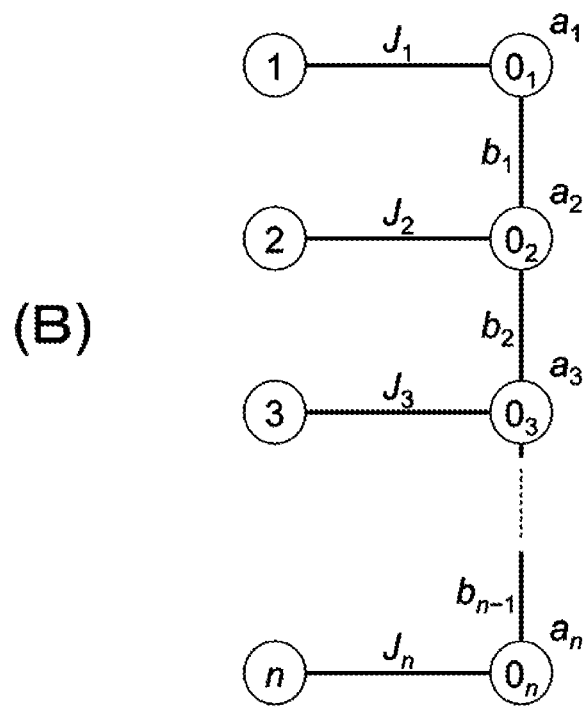

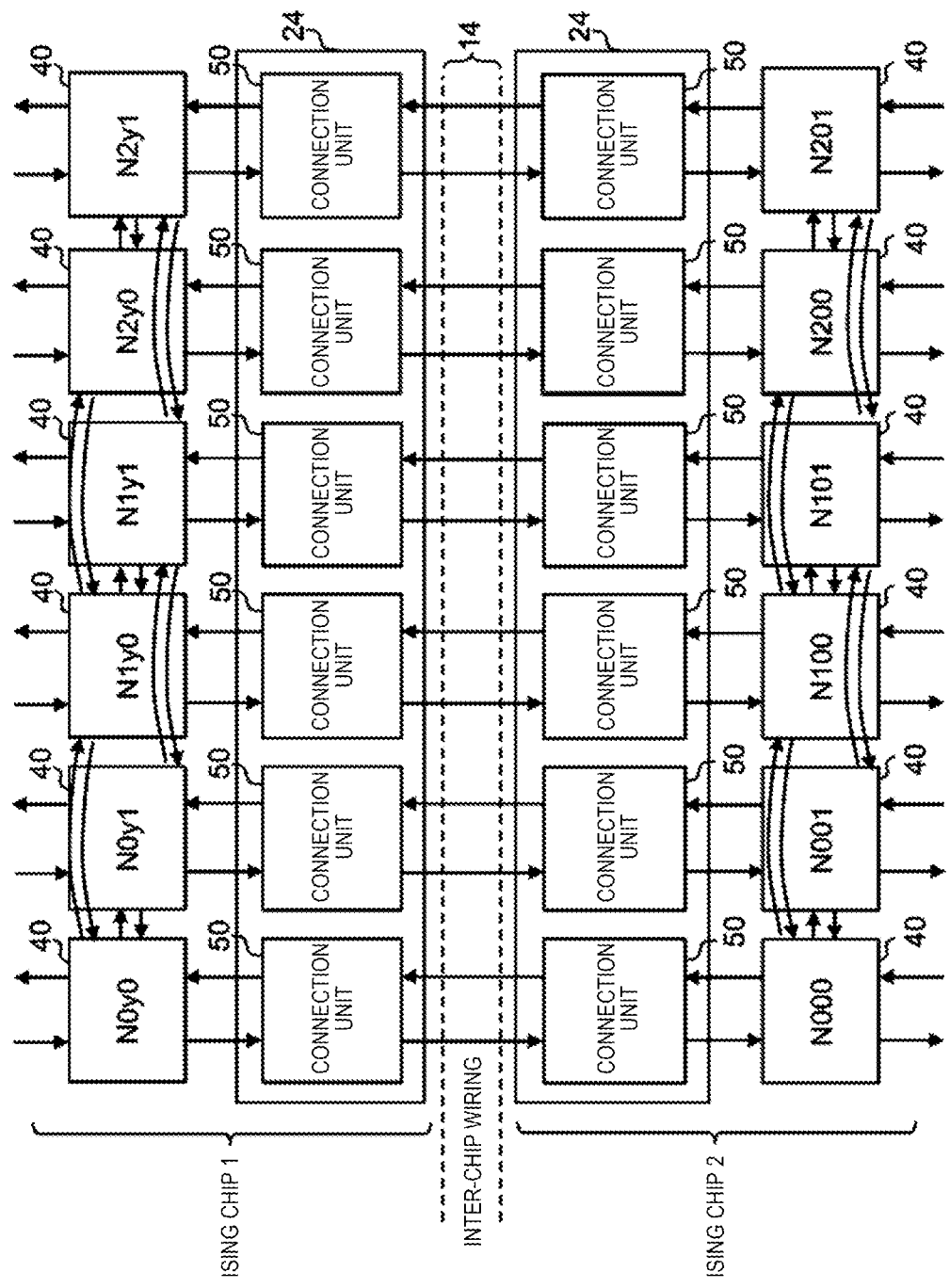
[Fig. 13]

[Fig. 14]
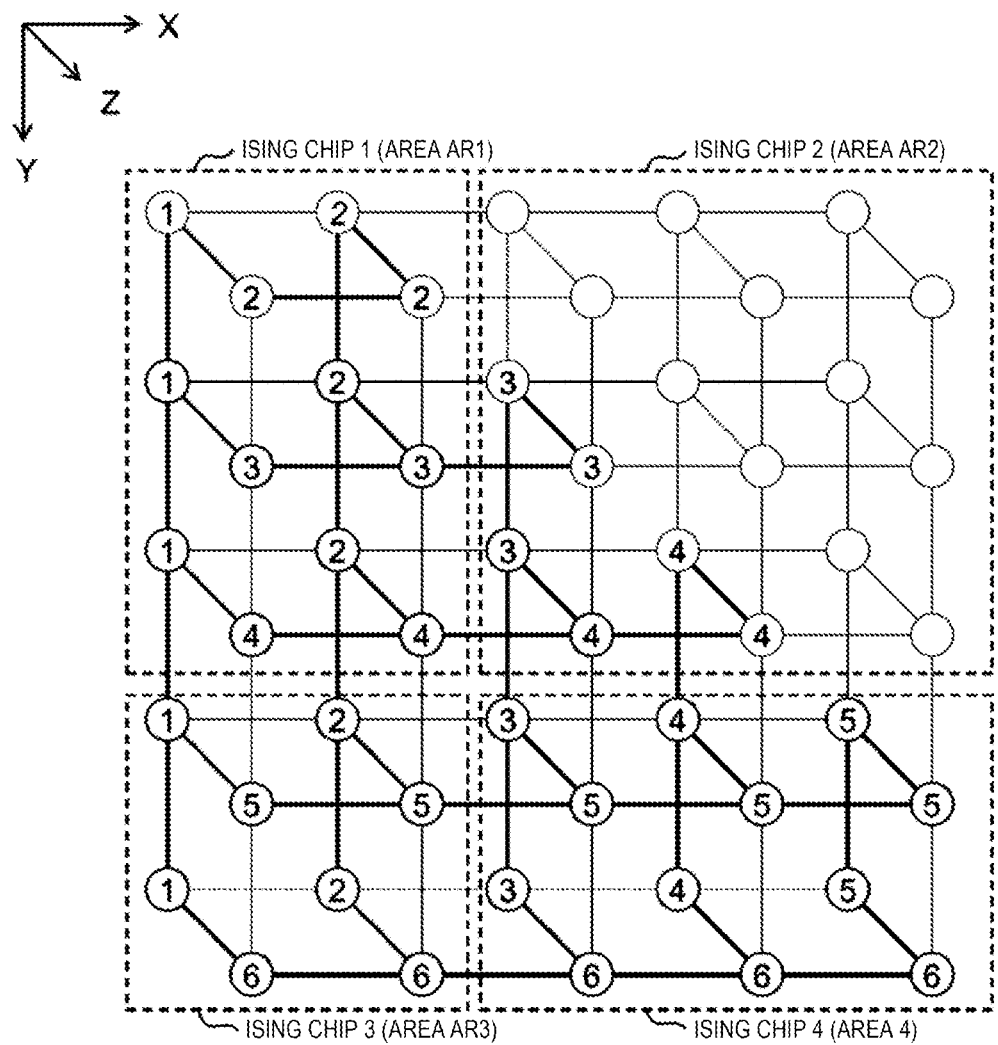

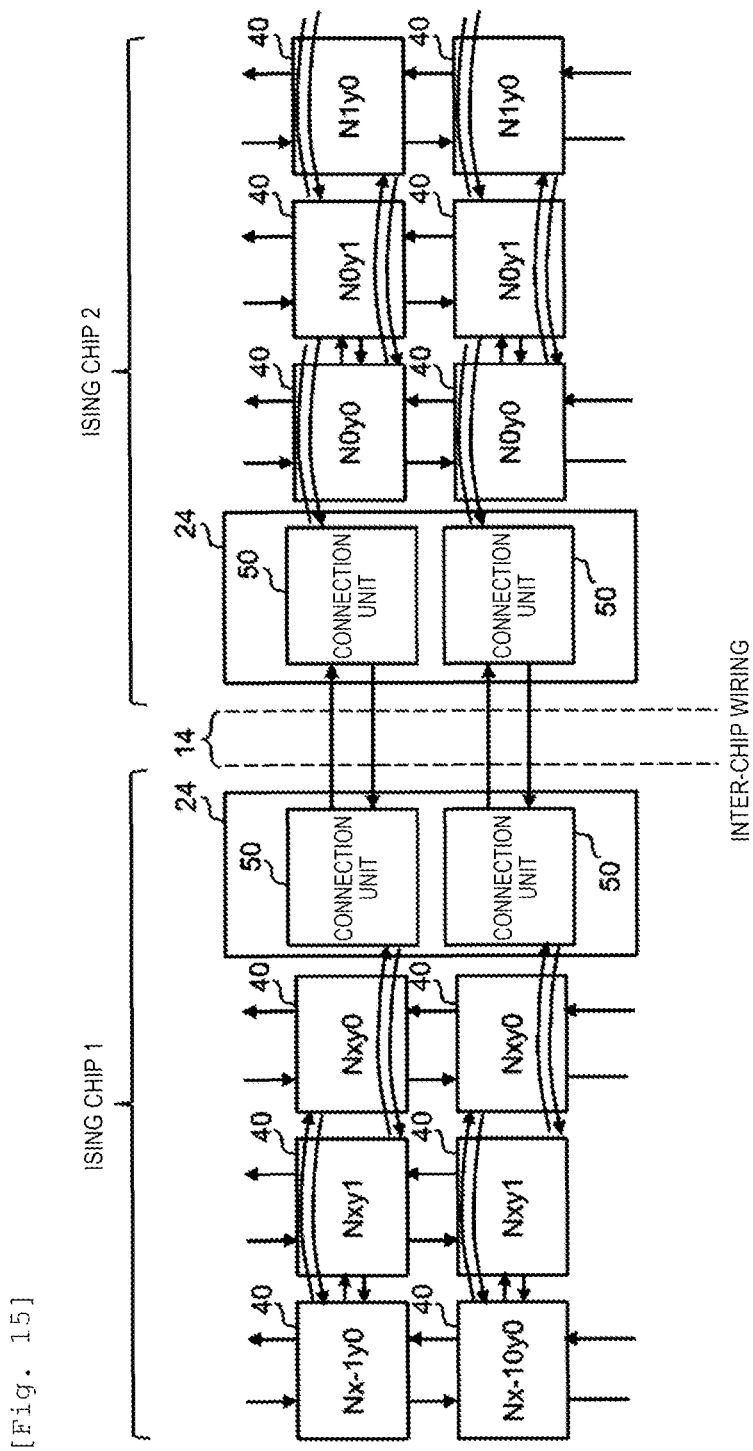
[Fig. 15]

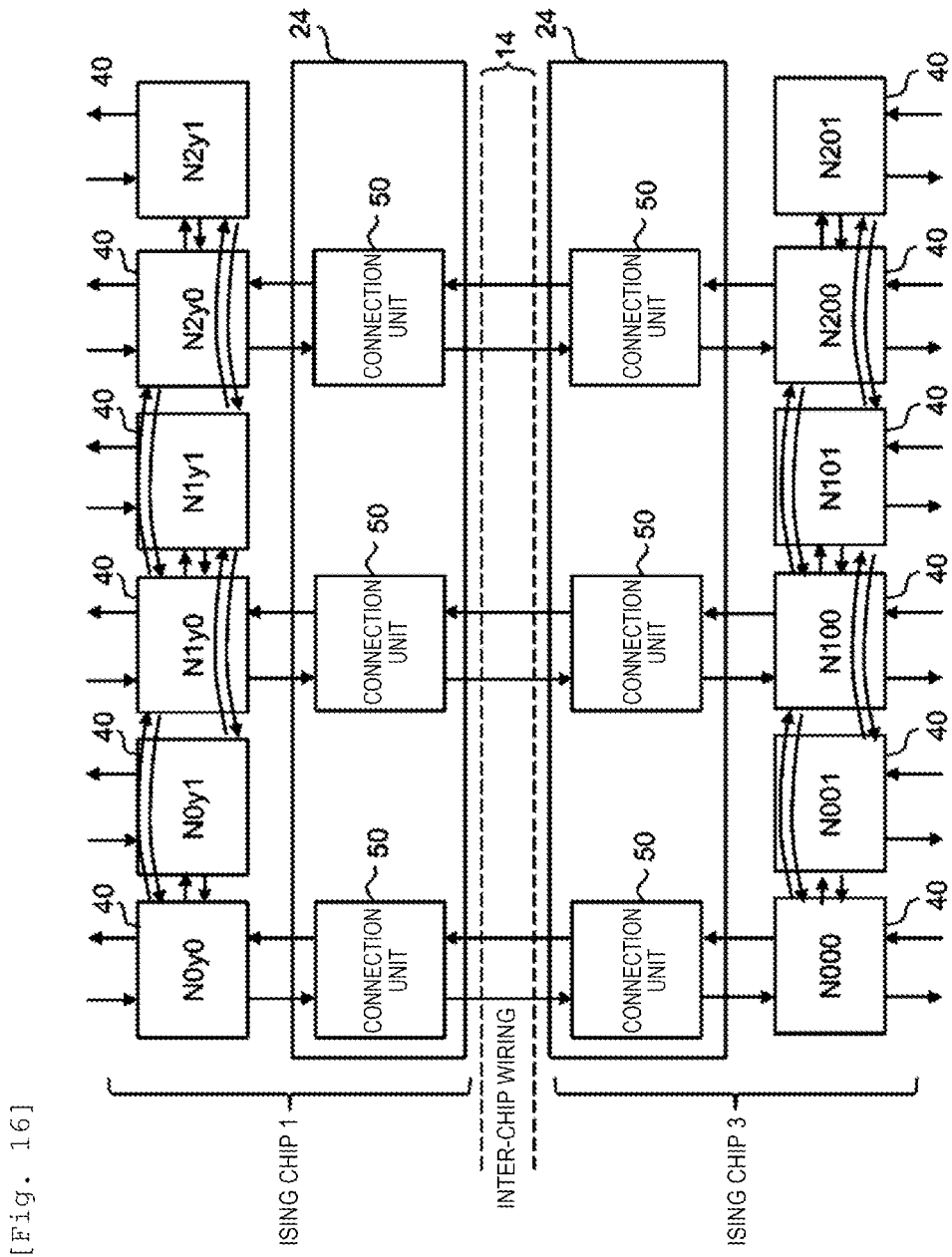
[Fig. 16]

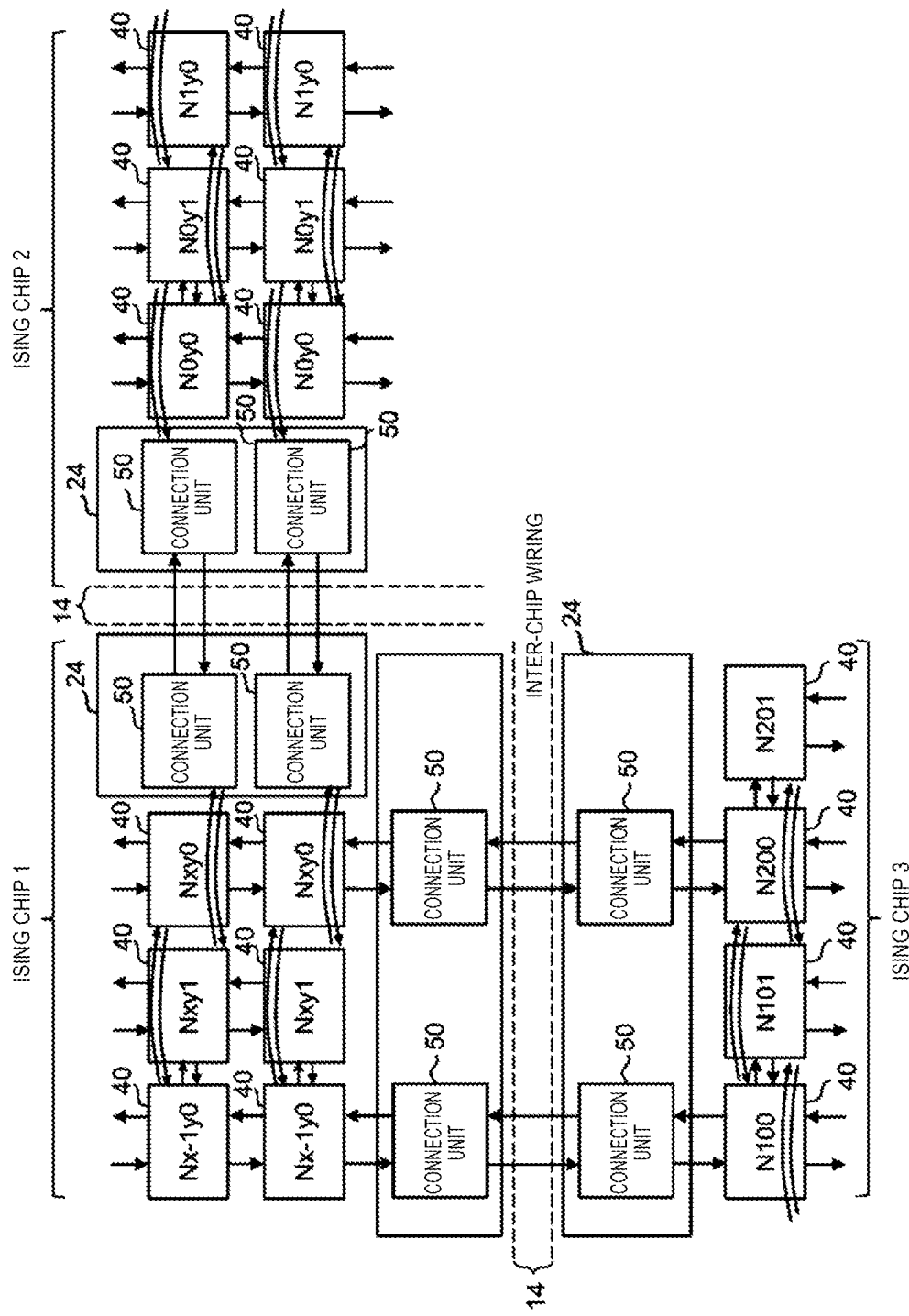
[Fig. 17]

[Fig. 18]
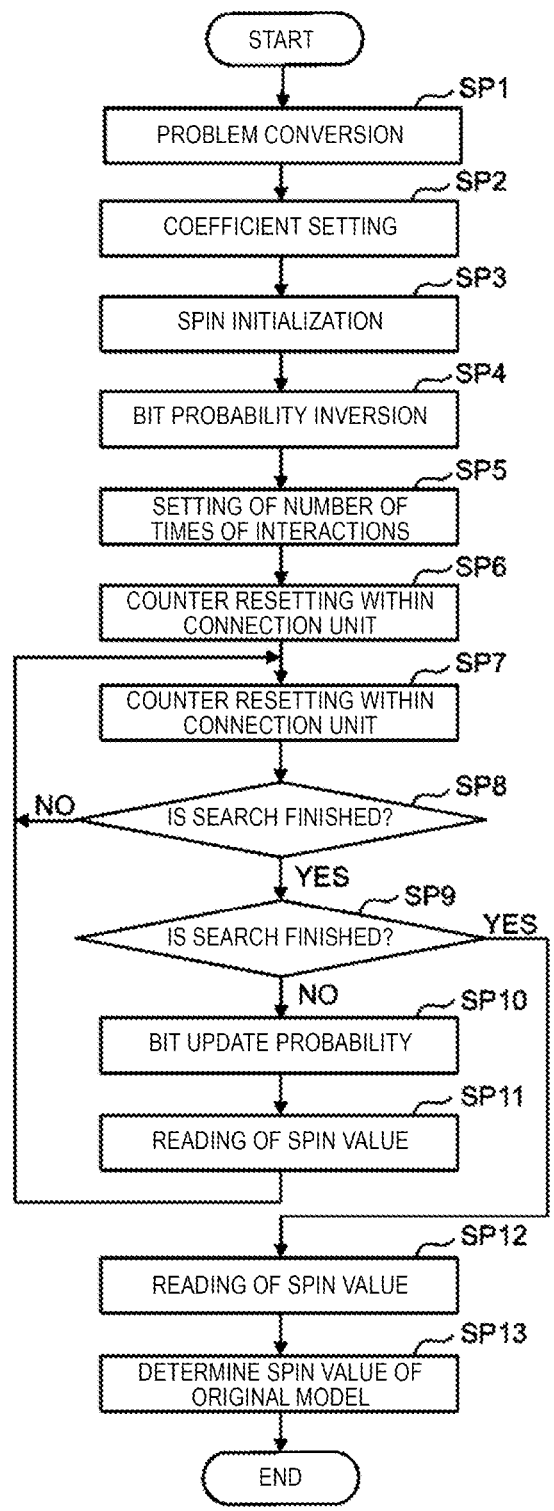

[Fig. 19]
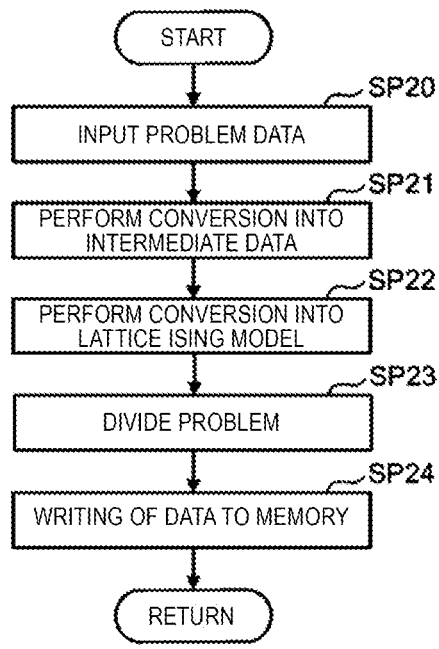
[Fig. 20]
(A)
INPUT DATA
```
1 1 1
1 3 1
1 4 2
1 5 1
2 3 3
⋮
```
INTERMEDIATE DATA
```
1 1 1
1 2 0
1 3 1
1 4 2
1 5 1
⋮
```
(B)
OUTPUT DATA
```
1 1 0
1 2 1
1 3 1
1 4 2
1 5 2
⋮
```
CORRESPONDENCE RELATIONSHIP BETWEEN PRE- AND POST-CONVERSION SPIN MODELS
```
1 {1, 2, 3, 4, 5}
2 {6,7,8,9,10,11,12}
3 {13,14,15,16,17,18}
⋮
```

[Fig. 21]
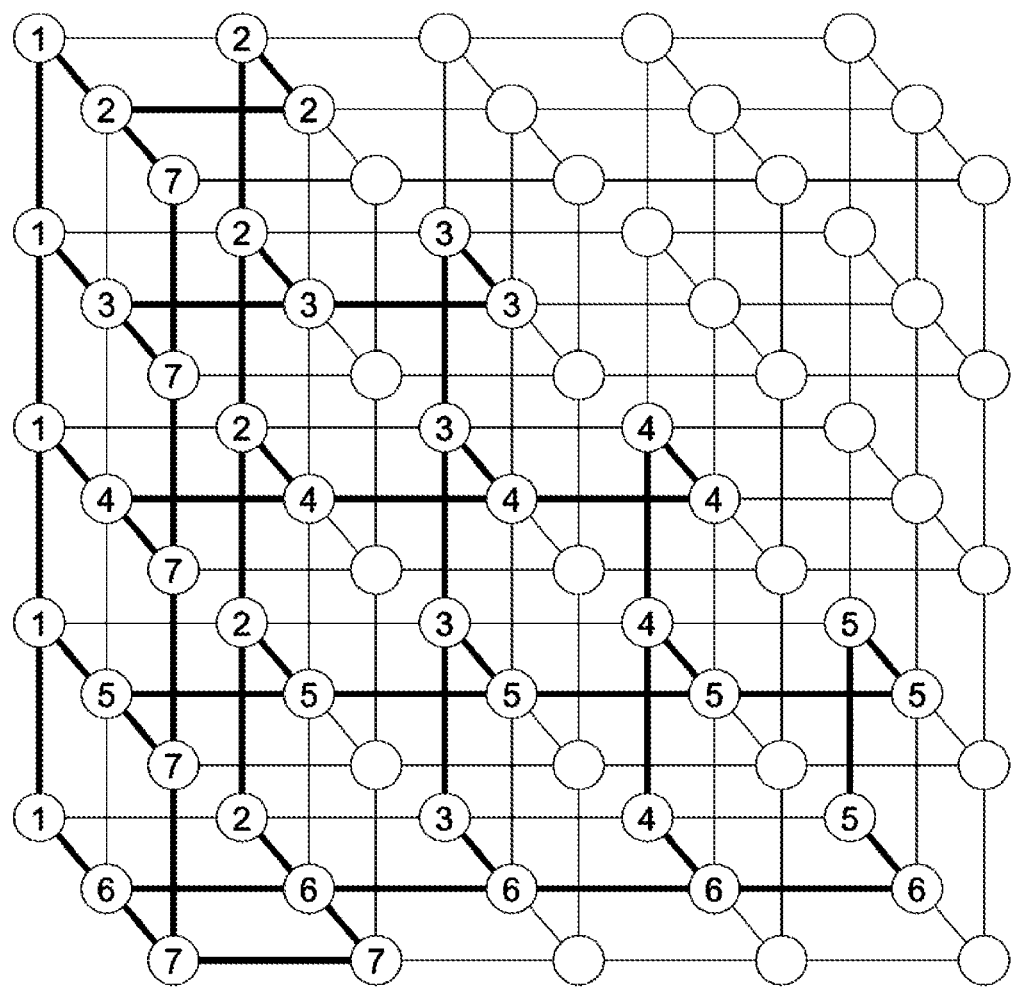

INFORMATION PROCESSING DEVICE AND CONTROL METHOD THEREFOR

TECHNICAL FIELD

The present invention relates to an information processing apparatus and a method of controlling the information processing apparatus, and particularly to an information processing apparatus that is an application suitable for making a search for a ground state of an Ising model to solve a minimization problem.

BACKGROUND ART

An Ising model is a model for statistical mechanics for describing a behavior of a magnetic body. The Ising model is defined with a spin that takes two values, +1 and −1 (0 and 1, or upper and lower), an interaction coefficient indicating an inter-spin interaction, and a certain external magnetic field coefficient for every spin.

Energy of the Ising model at that time can be calculated from a spin arrangement, an interaction coefficient, and an external magnetic field coefficient. Generally, an energy function of the Ising model is expressed the following equation.

[Equation 1]

$$E(s) = -\sum_{i<j} J_{i,j}\sigma_i\sigma_j - \sum_i h_i\sigma_i \quad (1)$$

It is noted that it is assumed that $\sigma_i$, and $\sigma_j$ are values of i-th and j-th spins, respectively, $J_{i,j}$ is an interaction coefficient between the i-th and j-th spins, $h_i$ is an external magnetic field coefficient for the i-th spin, and $\sigma$ denotes a spin arrangement.

In Equation (1), the first term is for calculating energy that results from the inter-spin interaction. Generally, the Ising model is expressed as being a undirected graph, and an interaction from the i-th spin to the j-th spin and an interaction from the j-th spin to the i-th spin are not distinguished. For this reason, in the first term, for a combination of $\sigma_i$ and $\sigma_j$, which satisfies i<j, an influence of the interaction coefficient is calculated. Furthermore, the second term is for calculating energy that results from an external magnetic field for each spin.

The search for the ground state of the Ising model is an optimization problem that is to obtain a spin arrangement that minimizes the energy function (generally, also called Hamiltonian) of the Ising model. The search for the ground state of the Ising model that is expressed with a non-planar graph is known as NP-hard. In recent years, an apparatus that makes a search for the ground state to efficiently solve this problem has been proposed (PTL 1).

CITATION LIST

Patent Literature

PTL 1: JP-A-2012-217518

SUMMARY OF INVENTION

Technical Problem

Incidentally, in an apparatus that is disclosed in PTL 1 in question, a graph structure (the Ising model) that is possibly expressed by a hardware configuration is limited. However, in a case where the optimization problem is converted into a problem of the search for the ground state of the Ising model, because the post-conversion Ising model is a form specific to the optimization problem therefor, the post-conversion Ising model cannot always be necessarily mapped to the apparatus in PTL 1. Consequently, when the optimization problem is addressed in various ways, it is required to realize a piece of hardware that possibly makes a search for the ground state of an arbitrary Ising model.

With a piece of hardware that possibly expresses a complete graph, that problem is solved. However, in this case, there is a problem in which because wiring within the piece of hardware is Complicated, not only do scalability and energy efficiency decrease, but low-cost and easy manufacturing cannot also be achieved.

Accordingly, the Ising model that obtains the ground state is required to be converted into an Ising model that is expressed with a graph which is possibly expressed by the piece of hardware, without causing the ground state to be changed. Particularly, when the piece of hardware is configured with a solid-state element, such as a semiconductor device, an array structure that is represented by a memory device, such as a Dynamic Random Access Memory (DRAM) or a Static Random Access Memory (SRAM) is available for realization thereof. For this reason, it is desirable that an arbitrary Ising model is converted into a lattice Ising model with the ground state remaining unchanged.

An object of the present invention, which was made taking into consideration the problems describe above, is to provide an information processing apparatus that can be manufactured at a low cost and with ease and that is capable of making a search for a ground state of an arbitrary Ising model, and a method of controlling the information processing apparatus.

Solution to Problem

In order to solve the problems described above, according to an aspect of the present invention, there is provided an information processing apparatus that calculates a ground state that is a spin arrangement which minimizes energy of a problem that is an Ising model, or a solution approximate to the ground state, as a solution to the problem, the apparatus including: a plurality of semiconductor chips, each of which retains a value of one spin or values of a plurality of spins and simulates interactions among the spins; inter-chip wiring that connects between each of the necessary semiconductor chips; and a control unit that controls each of the semiconductor chips and thus causes the each of the semiconductor chips to perform interaction computation, in which the control unit converts data of the problem into data of an lattice-shaped Ising model, which is possibly expressed by the plurality of semiconductor chips, without causing the spin arrangement, which is the ground state of the Ising model that is the problem, to be changed, and divides the data of the lattice-shaped Ising model, which results from the conversion, for allocation to each of the plurality of semiconductor chips.

According to another aspect of the present invention, there is provided a method of controlling an information processing apparatus that calculates a ground state that is a spin arrangement which minimizes energy of a problem that is an Ising model, or a solution approximate to the ground state, as a solution to the problem, the apparatus including a plurality of semiconductor chips, each of which retains a value of one spin or values of a plurality of spins and simulates interactions among the spins, inter-chip wiring that connects between each of the necessary semiconductor chips, and a control unit that controls each of the semiconductor chips and thus causes the each of the semiconductor chips to perform interaction computation, the method including: a first step of causing the control unit to convert data of the problem into data of a lattice-shaped Ising model, which is possibly expressed by the plurality of semiconductor chips, without causing the spin arrangement, which is the ground state of the Ising model that is the problem, to be changed; a second step of causing the control unit to divide the data of the lattice-shaped Ising model, which results from the conversion, for allocation to each of the plurality of semiconductor chips; and a third step of causing the control unit to cause each of the semiconductor chips to perform the interaction computation.

According to the information processing apparatus and the method of controlling the information processing apparatus, a search for the around state of an arbitrary Ising model can be made. Furthermore, among spins of which values are retained in a certain semiconductor chip, the number of spins that exert the interaction on a spin of which a value is retained in a different semiconductor chip can be reduced. Because of this, as a result, an amount of wiring of the inter-chip wiring that connects among the semiconductor chips can be reduced.

Advantageous Effects of Invention

According to the present invention, an information processing apparatus that can be manufactured at a low cost and with ease and that is capable of making a search for a ground state of an arbitrary Ising model, and a method of controlling the information processing apparatus can be realized.

BRIEF DESCRIPTION OF DRAWINGS

FIG. 1 is a block diagram illustrating an entire configuration of an information processing apparatus according to the present embodiment.

FIG. 2 is a block diagram illustrating a configuration of a multi-Ising chip.

FIG. 3 is a block diagram illustrating a configuration of an Ising chip.

FIG. 4 is a conceptual diagram for describing an example of a configuration of an spin array in the shape of a three-dimensional lattice.

FIG. 5 is a conceptual diagram for describing a configuration of the spin array.

FIG. 6 is a conceptual diagram for describing the configuration of the spin array.

FIG. 7 is a block diagram illustrating a configuration of a spin unit.

FIG. 8 is a block diagram illustrating the configuration of the spin unit.

FIG. 9 is a block diagram illustrating an example of an arrangement of spin units on the Ising chip.

FIGS. 10(A) and (B) are graphs for describing an Ising model conversion method according to the embodiment.

FIG. 11 is a conceptual diagram illustrating an example of a configuration of a lattice Ising model.

FIGS. 12(A) and 12(B) are conceptual diagrams for describing a method of determining each coefficient of the lattice Ising model according to the present embodiment.

FIG. 13 is a block diagram illustrating an example of connections among Ising chips.

FIG. 14 is a conceptual diagram for describing a method of dividing data of the lattice Ising model for allocation to each of the plurality of Ising chips.

FIG. 15 is a block diagram illustrating an example of connections among Ising chips according to the present embodiment.

FIG. 16 is a block diagram illustrating an example of connections among Ising chips according to the present embodiment.

FIG. 17 is a block diagram illustrating an example of connections among Ising chips according to the present embodiment.

FIG. 18 is a flowchart illustrating a processing procedure for ground state search processing.

FIG. 19 is a flowchart illustrating a processing procedure for Ising model conversion processing according to the present embodiment.

FIGS. 20(A) and 20(B) are conceptual diagrams for describing the Ising model conversion processing according to the present embodiment.

FIG. 21 is a conceptual diagram illustrating an example of a configuration of a lattice Ising model that is made up of a three-layered lattice graph.

DESCRIPTION OF EMBODIMENTS

An embodiment of the present invention will be described in detail below with reference to the drawings.

(1) Ising Model that Results from Expansion into Directed Graph

In the present embodiment, a model that is expressed in Equation (2) that follows, which results from expanding the Ising model, is hereafter assumed to be called an Ising model.

[Equation 2]
$$E(\sigma) = -\sum_{i \neq j} J_{i,j}\sigma_i\sigma_j - \sum_i h_i\sigma_i \qquad (2)$$

A difference with the Ising model that is expressed in Equation (1) is that an interaction, as is expressed with a directed graph, is allowed in Equation (2). Generally, an Ising model can be described as an undirected graph in a graph theory. This is because an interaction in the Ising model does not distinguish between interaction coefficients $J_{i,j}$ for spins from an i-th spin to a j-th spin and interaction coefficients $J_{j,i}$ for the spins from the j-th spin to the i-th spin.

According to the present invention, the Ising model is expanded, and thus, although $J_{i,j}$ and $J_{j,i}$ are distinguished, the present invention can be applied. Because of this, in the present embodiment, the Ising model that results from conversion into the directed graph is handled. It is noted that in a case where the undirected-graph Ising model is handed as the directed graph Ising model, this is possible by simply defining the same interaction coefficient in two directions as with $J_{i,j}$ and $J_{j,i}$. In this case, although the models are the same, a value of energy is two times higher in an energy function in Equation (2) than in an energy function in Equation (1).

(2) Configuration of Information Processing Apparatus According to the Present Embodiment (2-1) Entire Configuration of Information Processing Apparatus In FIG. 1, 1 denotes an information processing apparatus according to the present embodiment, as a whole. The information processing apparatus 1 is configured with a personal computer, a workstation, or a server, and includes a Central Processing Unit (CPU) 3, a memory 4, a storage device 5, and a plurality of multi-Ising chips 6, which are connected to each other through a system bus 2.

The CPU 3 is a processor that manages operational control of the entire information processing apparatus 1. Furthermore, the memory 4 is configured, for example, with a volatile semiconductor memory, and is used for storing various programs. The storage device 5 is configured, for example, with a hard disk drive or a Solid State Drive (SSD), and is used for retaining a program or data for a long period of time.

In the case of the present embodiment, a problem data 7 that is a problem in a single and Ising model format, which has to be solved by the present information processing apparatus 1, is stored in the storage device 5, and a problem conversion program 8 and a multi-Ising chip control program 9 are stored in the memory 4. The problem conversion program is a program that converts an Ising model for the problem in question into a single lattice Ising model that will be described below with reference to FIG. 11, whenever necessary, divides the problem into a plurality of partial problems, whenever necessary, and distributes these partial problems to individual multi-Ising chips 6, respectively. Furthermore, the multi-Ising chip control program 9 is a program for performing control for solving a partial problem that corresponds to an individual multi-Ising chip 6. The partial problem itself is a problem the single Ising model format that is independent of other partial problems.

It is noted that a program that converts a problem data not in the Ising model format into the problem data 7 in the Ising model format may be stored in the memory 4. The problem not in the Ising model format is possibly dealt with in this manner, and the utility of the present information processing apparatus 1 can be caused to be improved.

The multi-Ising chip 6 is a dedicated piece of hardware that makes a search for a ground state of the Ising model, and for example, like a Graphics Processing Unit (GPU) that is a piece of hardware dedicated to screen plotting processing, takes the form of an expansion card that is mounted in the information processing apparatus 1.

The multi-Ising chip 6, as illustrated in FIG. 2, is configured to include an interface 10, an Ising chip group 11, and a control unit 12, and performs transmission and reception of a command or information between the multi-Ising chip 6 itself and the CPU 3 (FIG. 1) through the interface 10 and the system bus 2 (FIG. 1).

The Ising chip group 11 is configured with a plurality of Ising chips 13, each of which is a piece of hardware dedicated to making a search for the ground state of the Ising model. Inter-chip wiring 14 provides connections among the Ising chips 13, and the Ising chips 13 transmit and receive necessary information through the inter-chip wiring 14.

The control unit 12 has a function of controlling each Ising chip 13 that constitutes the Ising chip group 11, and is configured to include a controller 15, an interaction clock generator 16, and a random number generator 17.

The controller 15 is a processor that manages operational control of the entire multi-Ising chip 6, and controls operation of each Ising chip 13 that constitutes the Ising chip group 11, or the interaction clock generator 16 and the random number generator 17, according to a command that is given from the CPU 3 (FIG. 1) of the information processing apparatus 1 through the system bus (FIG. 1) and the interface 10.

Furthermore, the interaction clock generator 16 is a clock generator that generates an interaction clock that will be described below. The interaction clock that is generated by the interaction clock generator 16 is given to each Ising chip 13 that constitutes the Ising chip group 11. The random number generator 17, as will be described below, causes a random number, which is a random bit sequence for preventing the search for the ground state that is made in each Ising chip 13 from ending up with a local optimal solution, to be generated. The random number that is generated by the random number generator 17 is given to each Ising chip 13.

(2-2) Configuration of the Ising Chip.

FIG. 3 illustrates a schematic configuration of the Ising chip 13. As illustrated in FIG. 3, the Ising chip 13 is configured to include a spin array 20, an input/output (I/O) address decoder 21, and I/O driver 22, an interaction address decoder 23, and an inter-chip connection unit 24. In the present embodiment, the Ising chip 13 is described on the assumption that the Ising chip 13 itself is mounted as Complementary Metal-Oxide Semiconductor (CMOS) integrated circuit which is currently in wide use, but can be also realized with other solid elements.

The Ising chip 13 includes an address bus 31 as an SRAM-compatible interface 30 for performing read or write, a data bus 32, an R/W control line 33, and an I/O clock line 34 in a spin array 20. Furthermore, the Ising chip 13 also includes an interaction address line 36 and an interaction clock line 37, as an interaction control interface 35 for performing control of the search for the ground state of the Ising model.

In the Ising chip 13, a spin $\sigma_i$ of the Ising model, the interaction coefficient $J_{i,j}$ and an external magnetic field coefficient $h_i$ are all expressed as pieces of information that is stored in memory cells with the spin array 20. Setting of an initial state of the spin $\sigma_i$ or reading of a solution that is available after completing the search for the ground state is performed through the SRAM-compatible interface 30. Furthermore, in the Ising chip 13, read or write of the interaction coefficient $J_{i,j}$ and the external magnetic field coefficient $h_i$ for setting the Ising model, the search for whose ground state is made, for the spin array 20 is also performed through the SRAM-compatible interface 30.

For this reason, an address is assigned to each of the spin the interaction coefficient and the external magnetic field coefficient $h_i$ within the spin array 20. Then, in a case where the spin $\sigma_i$, the interaction coefficient $J_{i,j}$ or the external magnetic field coefficient $h_i$ is read from or written to the Ising chip 13, a corresponding address is given from the controller 15 to the I/O address decoder 21 through the address bus 31, and an R/W control signal that controls the read or write of the spin $6_i$, the interaction coefficient $J_{i,j}$ or the external magnetic field coefficient $h_i$ is given from the controller 15 to the I/O driver 22 through the R/W control line 33.

Thus, the I/O address decoder 21 activates a word line of the spin array 20 based on the address that is given through the address bus 31, and the I/O driver 22 drives a corresponding bit line within the spin array 20 based on the R/W control signal that is given through the R/W control line 33. Accordingly, an initial value of the spin $\sigma_i$, or setting values of the interaction coefficient $J_{i,j}$ and the external magnetic field coefficient $h_i$, which are given through the data bus 32, are set for the spin array 20, or the solution that is available after completing the search for the ground state is read from the spin array 20 and is output to the outside through the data bus 32.

It is noted that the address bus 31 which constitutes the SRAM-compatible interface 30, the data bus 32, and the R/W control line 33 are synchronized to an I/O clock that is given from the control unit 12 to the Ising chip 13 through the I/O clock line 34 for operation. However, according to the present invention, an interface does not need to be a synchronous-type interface, and an asynchronous-type interface may be available. In the present embodiment, a description is provided on the assumption of the synchronous-type interface.

Furthermore, the Ising chip 13 realizes an inter-spin interaction within the spin array 20 in order to make the search for the ground state. The interaction control interface 35 controls these interactions from the outside. Specifically, an address for designating a spin group that performs interactions, which is given from the controller 15, through the interaction address line 36 is input into the Ising chip 13, and the Ising chip 13 is synchronized with the interaction clock from the interaction clock generator 16, which is input through the interaction clock line 37, to perform the interaction. Based on the address that is given through the interaction address line 36, the interaction address decoder 23 performs the read or write of the interaction coefficient $J_{i,j}$ and the external magnetic field coefficient $h_i$ on the spin array 20.

In addition, the Ising chip 13, as will be described below, has a random number introduction line 38 for introducing a random number that probabilistically causes a value of a memory cell, which expresses a spin of the Ising model, to be inverted. The random number that is generated by the random number generator 17 that is described above with reference to FIG. 2 is given to the spin array 20 through the random number introduction line 38.

The inter-chip connection unit 24 functions as an interface when transmits and receives a value of the spin $\sigma_i$ necessary between the Ising chips 13 that are positioned adjacent to each other. The inter-chip connection unit 24 will be described in detail below.

(2-3) Configuration of the Spin Array

The spin array 20 has a configuration in which a plurality of spin units are arranged side by side with, in which case, a spin unit that realizes retention of one spin $\sigma_i$ and the interaction coefficient $J_{i,j}$ and the external magnetic field coefficient $h_i$ that are contingent on the one spin $\sigma_i$, and computation of the search for the ground state is a basic unit of configuration.

FIG. 4 illustrates an example in which an Ising model that has a topology in the shape of a three-dimensional lattice is configured by arranging a plurality of spin units 40 are arranged side by side. An example in FIG. 4 is an three-dimensional lattice with dimensions of 3 (the X-axis direction)×3 (the Y-axis direction)×2 (the Z-axis direction). When it comes to coordinate axes, as illustrated, a rightward or leftward direction on the drawing is defined as the X-axis, a downward direction on the drawing as the Y-axis, and a frontward or backward direction on the drawing as the Z-axis, but this coordinate axis is only necessary for convenient description of the embodiment without having no relation to the present invention. In a case where topologies other than the three-dimensional lattice, for example, such as a tree and branch topology, are used, expressions using the number of branches of the tree or the like are available in addition to the coordinate axes. In the topology in the shape of a three-dimensional lattice in FIG. 4, when the inter-spin interaction is plotted on a graph, the spin (apex) of the degree 5 at most is necessary. It is noted that the degree 6 at most is necessary when a connection to the external magnetic field coefficient is also taken into consideration.

Values of adjacent spins (for example, $\sigma_j$, $\sigma_k$, $\sigma_l$, $\sigma_m$, and $\sigma_n$ in a case where the number of adjacent spins is 5) are input into one spin unit 40 that is illustrated in FIG. 4. For reason, the spin unit 40 has a memory cell for retaining these values of the adjacent spins that are input. Furthermore, in addition to values of the spins in question, the spin units 40 have memory cells, each of which retains an external magnetic field coefficient and coefficients for interactions among the adjacent spins (coefficients for interactions among adjacent five spins: $J_{j,i}$, $J_{k,i}$, $J_{l,i}$, $J_{m,i}$, and $J_{n,i}$)

(2-4) Configuration of the Spin Unit

An example of a configuration of the spin unit 40 will be described below with reference to FIGS. 7 and 8. The spin unit 40 has two aspects. Although the spin units 40 are separately illustrated in FIGS. 7 and 8 for convenience, but one spin unit 40 includes both configurations in FIGS. 7 and 8. FIG. 7 illustrates a circuit for realizing interactions among spin units 40. FIG. 8 illustrates a configuration of the spin unit 40 within a focus on a bit line 41 and a word line 42 that are interfaces for access to memory cells N, IS0, IS1, IU0, IU1, IL0, IL1, IR0, IR1, ID0, ID1, IF0, and IF1 that the spin unit 40 has, from outside of the Ising chip 13.

Because the spin unit 40 retains the spin $\sigma_i$ of the (sing model, the interaction coefficients $J_{j,i}$ to $J_{n,i}$ and the external magnetic field coefficient $h_i$, the spin unit 40 includes a plurality of one-bit memory cells N, IS0, IS1, IU0, IU1, IL0, IL1, IR0, IR1, ID0, ID1, IF0, and IF1. It is noted that the memory cells IS0 and IS1, the memory cells IU0, and IU1, and the memory cells IL0 and the memory cells IR0 and IR1, and the memory cell ID0 and ID1, and the memory cell IF0 and IF1 each play a role as a set of two, and that because of this, for convenience, these are collectively abbreviated to ISx, IUx, ILx, IRx, and IDx, or IFx, respectively, for the memory cell (Refer to FIG. 5).

The spin unit 40 is described here as expressing an i-th spin. The memory cell N is a memory cell for realizing a spin, and retains a value of the spin. The values of the spin is +1 and −1 (+1 expresses an upward direction and −1 expresses a downward direction) in the Ising model, but these are caused to correspond to 0 and 1, respectively, that are two values which are retainable by the memory cell. For example, +1 is caused to correspond to 1, and −1 is caused to correspond to 0.

FIG. 5 illustrates a correspondence relationship between each of ISx, IUx, ILx, IRx, IDx, and IFx for the memory cell, which are retained in the spin unit 40, and the topology of the Ising model that is illustrated in FIG. 4. The external magnetic field coefficient is stored in ISx for the memory cell. Furthermore, the interaction coefficient is stored in each of IUx, ILx, IRx, IDx, and IFx for the memory cell. Specifically, coefficients for interactions with a spin on the upper side (−1 in the Y-axis direction), a spin on the left side (−1 in the X-axis direction), a spin on the right side (+1 in the X-axis direction), a spin on the lower side (+1 in the Y-axis direction), and a spin (+1 or −1 in the Z-axis direction) that is connected in the frontward or backward direction on the drawing are stored in IUx for the memory cell, ILx for the memory cell, IRx for the memory cell, IDx for the memory cell, and IFx for the memory cell, respectively.

Furthermore, in a case where the Ising model is apprehended as the directed graph, when judged from a certain spin, a different spin has a coefficient of an influence that is exerted on the certain spin itself. A coefficient of an influence that a certain spin exerts on a different spin belongs to the different spin. That is, the spin unit 40 is connected to five spins at most. In the Ising chip 13 according to the present embodiment, correspondence to three values, that is, +1, 0, and −1, as the external magnetic field coefficient and the interaction coefficient, is established. For this reason, in order to express the external magnetic field coefficient and the interaction coefficient, two-bit memory cells are necessary for each.

ISx, IUx, ILx, IRx, IDx, and IFx for the memory cell, express three values that is, +1, 0, and −1, using a combination of two memory cells (for example, memory cells IS0 and IS1 in the case of ISx for the memory cell) of which the least significant bits are 0 and 1, respectively y. For example, in the case of the ISx for the memory cell, +1 or −1 is expressed with a memory cell IS1. When a value that is retained in the memory cell IS1 is 1, this expresses +1, and when the value that is retained in the memory cell IS1 is 0, this expresses −1.

In addition, when a value that is retained in the memory cell IS0 is 0, the external magnetic field coefficient is regarded as 0, and when a value that is retained in the memory cell IS0 is 1, any one of +1 and −1 that is determined with the value that is retained in the memory cell IS1 is set to be the external magnetic field Coefficient. When the external magnetic field coefficient is 0, if it is considered that by default, the external magnetic field coefficient is set, it is can be said that the value that is retained in the memory cell IS0 is an enabling bit of the external magnetic field coefficient (when IS0=1, the external magnetic field coefficient is enabled). For IUx, ILx, IRx, IDx, and IFx for the memory cell in which the interaction coefficient is stored, a coefficient and a value of a bit are caused to correspond to each other in the same manner.

Reading from and writing to each of the memory cells N, IS0, IS1, IU0, IU1, IL0, IL1, IR0, IR1, ID0, ID1, IF0 and IF1 in the spin unit 40 have to be possible from outside of the Ising chip 13. For this reason, as illustrated in FIG. 8, each of the spin unit 40 has the bit line 41 and the word line 42.

Then, in the Ising chip 13, as illustrated in FIG. 9, the spin units 40 are arranged in the form of a tile by side on a semiconductor substrate, and the bit line 41 and the word line 42 are connected to the spin units 40. With the I/O address decoder 21 and the I/O driver 22, these spin units 40 are driven to perform control or reading, and thus in the same manner as in a general-purpose Static Random Access Memory (SRAM), the reading from and the writing to the memory cells within the spin unit 40 can be performed with the SRAM-compatible interface 30 of the Ising chip 13.

It is noted that FIG. 6 illustrates to which apex the spin unit (to which a reference character, such as Nxyz, is given depending on its position on the X-axis, the Y-axis, and the Z-axis) that is expressed in FIG. 9 corresponds in the topology in the shape of a three-dimensional lattice. In order to plot the apex of the three-dimensional lattice with dimensions of 3×3×2 on a two-dimensional plane, each lattice apex in a lattice apex arrangement in the Z-axis direction is positioned to be inserted between lattice apex arrangements in the X-axis direction. That is, an arrangement is made in the Y-axis direction (the lower side of the drawing is the positive direction of the Y-axis) on the two-dimensional plane in FIG. 9 in this order: Nx0z, Nx1z, Nx2z, but spin units, the Z-axis direction coordinates of which are 0 and 1, are alternately arranged in the X-axis direction (the right side of the drawing is the positive direction of the X-axis) in this order: N0y0, N0y1, N1y0, N1y1, N2y0, N2y1.

Furthermore, in order to perform update in the same time, the spin unit 40 has a circuit for calculating an interaction and thus determining a state of a next spin. Circuits of the spin units 40 are independent of each other. In FIG. 7, the spin unit 40 has signal lines EN, NU, NL, NR, ND, NF, ON, and RND, as an interface to the outside. The signal line EN is an interface for inputting a renewal signal that approves update of a spin of the spin unit 40. By controlling a selector 43 with this renewal signal, a value of a spin that is retained in the memory cell N can be updated to a value that is given from a majority-determination logic circuit 44, which will be described below, to the selector 43 through an OR circuit 45.

The signal line ON is an interface for outputting a value of a spin of the spin unit 40 to a different spin unit 40 (an adjacent unit in the topology in FIG. 4). The signal lines NU, NL, NR, ND, and NF are interfaces for inputting value of spins that are retained in other spin units 40, respectively (adjacent units in the topology in FIG. 4). The signal line NU is for input from a spin (−1 on the Y-axis direction) on the upper side, the signal line NL is for input from a spin (−1 in the X-axis direction) on the left side, the signal line NR is for input from a spin (+1 in the X-axis direction) on the right side, the signal line ND is for input from a spin (+1 in the Y-axis direction) on the lower side, and the signal line NF is for input from a spin (+1 or −1 in the Z-axis direction) that is connected in the frontward or backward direction on the drawing.

In the spin unit 40, a next state of the spin is determined in such a manner that energy is minimized between adjacent spins, but when judged from the product of the coefficient for the interaction with an adjacent spin and the external magnetic field coefficient, this is equivalent to determining whether which of a positive value and a negative value is predominant. For example, when spins $\sigma_j$, $\sigma_k$, $\sigma_l$, $\sigma_m$, and $\sigma_n$ are assumed to be adjacent to an i-th spin $\sigma_i$ a next state of the spin $\sigma_i$ is as follows.

First, values of adjacent spins are assumed to be $\sigma_j=+1$, $\sigma_k=-1$, $\sigma_l=+1$, $\sigma_m=-1$, and $\sigma_n=+1$, respectively, and interaction coefficients are assumed to $J_{j,i}=+1$, $J_{k,i}=+1$, $J_{l,i}=-1$, $J_{m,i}=-1$, and $J_{n,i}=-1$, respectively, and an external magnetic field coefficient is assumed to be $h_i=+1$. At this time, when the products of the interaction coefficient and the adjacent spin, and the external magnetic field coefficient are arranged side by side, $\sigma_j \times J_{j,i}=+1$, $\sigma_k \times J_{k,i}=-1$, $\sigma_l \times J_{l,i}=+1$, $\sigma_m \times J_{m,i}=+1$, $\sigma_n \times J_{n,i}=-1$, and $h_i=+1$ are obtained. The external magnetic field coefficient may be replaced with a coefficient for an interaction with a spin of which a value is always +1.

At this point, local energy between an i-th spin and an adjacent spin results from multiplying each of the coefficients described above by a value of the i-th spin and then reversing a sign of the result of the multiplication. For example, the local energy between the j-th spin and the adjacent spin is −1 when the i-th spin is set to 1 and is +1 when the i-th spin is set to −1. Because of this, the setting of the i-th spin to +1 leads to coming into play in the direction of decreasing the local energy here.

When this local energy is considered based on between all adjacent spins and the external magnetic field coefficient, it is calculated to which of +1 and −1 the i-th spin can be set to decrease the energy. This is because it is desirable to perform calculation to determine which of the number of +1's and the number of −1's is greater, in arranging side by side the above-described product of the interaction coefficient and the adjacent spin, and the external magnetic field coefficient. In the example described above, the number of +1's is 4 and the number of −1's is 2. If the i-th spin is set to +1, a total sum of amounts of energy is −2, and when the i-th spin is set to −1, the total sum of amounts of energy is +2. Consequently, a next state of the i-th spin in which the energy is minimized can be determined by applying the majority rule that when the number of +1's is greater, a next state of the i-th spin is set to +1, and when the number of −1's is greater, the next state of the i-th spin is set to −1.

A logic circuit 46 that is illustrated in FIG. 7 is a circuit for performing the interaction described above. First, XNOR of exclusive OR of a state of an adjacent spin and values that are retained in memory cells IU1, IL1, IR1, ID1, and IF1 which indicate that the interaction coefficient is +1 or −1 is obtained by an XNOR circuit 47. Accordingly, when judged only from the interaction, the next state of the spin in which the energy is minimized can be calculated (it is assumed that +1 is encoded into 1 and −1 into 0).

In a state where the interaction coefficient is only +1 or −1, if which one of the numbers of +1's and −1's, which are outputs of the XNOR circuit 47, is the greater is determined in the majority-determination logic circuit 44 using a majority-determination logic, the next state of the spin can be determined. Regarding the external magnetic field coefficient, if it is considered that the external magnetic field coefficient is equivalent to the coefficient for the interaction with the spin of which a state is always +1, a value of the external magnetic field coefficient is simply a value that has to be input into the majority-determination logic circuit 44 that determines the next state of the spin.

Next, a method of realizing a coefficient 0 will be described. When a majority-determination logic f (I1, I2, I3, and so forth up to In) with n inputs is present, it can be said that the following propositions are true. First, it is assumed that I'1, I'2, I'3, and so forth up to I'n, which are duplicates of inputs I1, I2, I3, and so forth up to In, respectively, are preset (For arbitrary k, Ik=I'k). At this time, outputs of f(I1, I2, I3, and so forth up to In) are equivalent to f(I1, I2, I3, and so forth up to In and I'1, I'2, I'3, and so forth I'n), respectively, that results from inputting the duplicates as well. More precisely, although a pair of input variables that are the same is input, an output is unchanged. Moreover, in addition to inputs I1, I2, I3, and so forth up to In, one more input Ix and an inversion input !Ix, which results from inverting the input ix, are assumed to be present. At this time, outputs of f (I1, I2, I3, and so forth up to In, Ix, !Ix) are equivalent to those of f (I1, I2, I3, and so forth up to In). More precisely, when an input variable and an inversion input variable that results from inverting the input variable are input, the majority rule comes into play to cancel an influence of the input variable. A coefficient 0 is realized using an attribute of the majority-determination logic.

Specifically, as illustrated in FIG. 7, using a XOR circuit 48, with a value of a bit (a bit that is retained in each of the bit cells IS0, IU0, IL0, IR0, ID0, and IF0) that determines enabling of a coefficient, a duplicate of a value that is a candidate for the next state of the spin, which is described above, and an inversion value that results from inverting the duplicate of the value are input at the same time into the majority-determination logic circuit 44. For example, in a case where a value of bit that is retained in the memory cell IS0 is 0, a value of a bit that is retained in the memory cell IS1, and a value that results from inverting the value of the bit that is retained in the memory cell IS1 are input in the same time in the majority-determination logic circuit 44. Because of this, there is no influence of the external magnetic field coefficient (this is equivalent to the external magnetic field coefficient being 0). Furthermore, in a case where the value of the bit that is retained in the memory cell IS0 is 1, the value of the bit that is retained in the memory cell IS1 and a value (duplicate) that is the same as the value of the bit are input at the same time into the majority-determination logic circuit 44.

With the minimization of the energy due to the inter-spin interaction, which is described above, the search for the ground state of the applied Ising model can be realized, but only with this, there is a likelihood that the search will end up with the local optimal solution. Basically, there is only motion that comes into play in the direction of decreasing the energy, once the search ends up the local optimal solution, escaping from the local optimal solution is not possible and thus a global option solution is not reached. For this reason, the spin unit 40 has an RND line 49 as an interface, in order to cause a value of a memory cell, which expresses a spin, to be probabilistically inverted as an operation for escaping from the local optimal solution.

Then, a random number that, as described above, is given from the random number generator 17 (FIG. 2) to the spin array 20 (FIG. 3) through the random number introduction line 38 (FIG. 3) is given to the spin unit 40 through the RND line 49, and this random number is input into the OR circuit 45 and thus a value of the spin is probabilistically inverted.

(3) Method of Searching for a Ground State of an Arbitrary Ising Model that Uses the Lattice Ising Model Next, an Ising model ground state search method according to the present embodiment will be described which searches for aground state of an arbitrary Ising model by applying a semiconductor chip that possibly expresses a lattice-shaped Ising model (this is hereinafter called a lattice Ising model), as the multi-Ising chip 6 (FIG. 1) and using the multi-Ising chip 6.

(3-1) Method of Converting Arbitrary Ising Model into the Lattice Ising Model

A method is known in which a plurality of spins are regarded as a set (this is hereinafter called a spin set) that represents one spin and an Ising model is converted, and thus a structure of the Ising model is caused to be changed without causing a spin arrangement of the ground state to be changed. An Ising model conversion method will be described in which using this method, the problem data 7 (FIG. 1) that represents an arbitrary Ising model is converted into the lattice Ising model that is possibly expressed by the multi-Ising chip 6 while guaranteeing that the spin arrangement that is the ground state is unchanged.

FIGS. 10(A) and 10(B), and FIG. 11 illustrate a procedure for the Ising model conversion method. First, the problem data 7 that represents an Ising model which is illustrated in FIG. 10(A) is regarded as an interaction between spins that do not interact with each other, of which a coefficient is "0", and thus is converted into data of an Ising model as a complete graph that is illustrated in FIG. 10(B). Next, the Ising model that is illustrated in FIG. 10(B) is converted into a nonplanar stepwise lattice Ising model that is illustrated in FIG. 11 without causing the ground state to be changed. However, the Ising model that is illustrated in FIG. 10(A) may be converted directly into the lattice Ising model that is illustrated in FIG. 11.

In a case where the complete graph in FIG. 10(B) is converted into the stepwise lattice Ising model that is made up of a two-layered lattice graph that is illustrated in FIG. 11, a spin in a spin set is positioned as illustrated in FIG. 11. It is noted that in FIG. 11, a number of a spin indicates to which spin in an original Ising model (FIG. 10(A) or 10(B)) such a spin corresponds. A spin group that is expressed as "1" is equivalent to a spin set that represents a spin 1 in the original Ising model. When it comes to the spin 1 in the original Ising model and a spin set 1 of the Ising model that is illustrated in FIG. 11, it is expected that values in their respective ground states are the same. In this manner, the spin in the spin set is positioned in such a manner that the post-conversion lattice Ising model is stepwise, and thus the problem data 7 can be converted into the lattice Ising model that is made up of as small a number of spins and as small a number of connections among the spins as possible.

At this point, a configuration of the Ising model in FIG. 11 will be described in more detail below. It is noted that in FIG. 11, an upper left spin on a rear-side layer in the Z-axis direction is assumed to be at the origin (coordinates (0, 0, 0)), X coordinates of spins that are adjacent, sequentially in the X-axis direction, to this spin are assumed to be 1, 2, and so forth, respectively, Y coordinates of spins that are adjacent, sequentially in the Y-axis direction, to the spin at the origin are assumed to be 1, 2, and so forth, respectively, and a Z coordinate of a front-side layer in the Z-axis direction is assumed to 1.

In the lattice Ising model that is illustrated in FIG. 11, in the rear-side layer (the layer of which a Z coordinate is "0") in the Z-axis direction, spins "1" are arranged at positions (0, 0, 0), (0, 1, 0), (0, 2, 0), (0, 3, 0), and (0, 4, 0), respectively, spins "2" are arranged at positions (1, 0, 0), (1, 1, 0), (1, 2, 0), (1, 3, 0), and (1, 4, 0), respectively, spins "3" are arranged at positions (3, 1, 0), (3, 2, 0), (3, 3, 0), and (3, 4, 0), respectively, spins "4" are arranged at positions (4, 2, 0), (4, 3, 0), and (4, 4, 0), respectively, and spins "5" are arranged at positions (5, 3, 0) and (5, 4, 0), respectively.

Furthermore, in the front-side layer (the layer of which a Z coordinate is "1") in the Z-axis direction, spins "2" are arranged at positions (0, 0, 1) and (1, 0, 1), respectively, spins "3" are arranged at positions (0, 1, 1), (1, 1, 1), and (2, 1, 1), respectively, spins "4" are arranged at positions (0, 2, 1), (1, 2, 1), (2, 2, 1), and (3, 2, 1), respectively, spins "6" are arranged at positions (0, 3, 1), (1, 3, 1), (2, 3, 1) and (3, 3, 1), respectively, and spins "6" are arranged at positions (0, 4, 1), (1, 4, 1), (2, 4, 1), (3, 4, 1), and (4, 4, 1), respectively.

Moreover, in FIG. 11, a side that links between spins that exert the interaction is indicated with a bold line, and a side that links between spins that do not exert the interaction is indicated with a fine line. More precisely, the lattice Ising model in FIG. 11, only spins that are adjacent in the Y-axis direction to each other exert the interaction in the rear-side layer in the Z-axis direction, only spins that are adjacent in the X-axis direction to each other exert the interaction in the front-side layer in the Z-axis direction, and only spins that are adjacent in the Z-axis direction to each other exert the interaction between the rear-side layers and the front-side layers in the Z-axis direction. However, in a case where a side in which an interaction coefficient is set to "0" is added in order to generate the complete graph in FIG. 10(B), a side that links between spins which do not exert the interaction is present in the lattice Ising model that is illustrated in FIG. 11. For this reason, there is a likelihood that the interaction coefficient will be 0 in the side that links between the spins, which is indicated with the bold line.

In the case of the complete graph in which the number of spins is N, N−1 interactions are present for one spin. However, in a three-dimensional lattice graph, the degree is 6 at most. For this reason, in the complete graph, as is, in which N>8, an expression that uses the lattice graph cannot be provided. Accordingly, with the introduction of the spin set, the degree per spin is reduced.

In order to secure the inter-spin interaction, spins in a spin set are arranged in the lattice graph as illustrated in FIG. 11. More precisely, the spins in the spin set are positioned in such a manner that the length of the spins expand only in a specific direction in each layer. FIG. 11 is an example in which spins are arranged in such a manner that in Z=1, the length of spins in each spin set in the X direction expands, and that in Z=0, the length of spins in each spin set in the Y direction expands.

(3-2) Method of Determining Each Coefficient in the Post-Conversion Lattice Ising Model In order to convert an arbitrary Ising model into the lattice Ising model in such a manner that the ground state thereof is not caused to be changed, when the lattice Ising model in FIG. 11 is generated, the interaction coefficient or the external magnetic field coefficient is required to be suitably determined.

Accordingly, a method of determining each coefficient in the lattice Ising model, which is used when the Ising model in FIG. 10(A) or 10(B) is converted into the lattice Ising model in FIG. 11 will be described with reference to FIGS. 12(A) and 12(B).

FIG. 12(A) illustrates a pre-conversion Ising model. In practice, interactions are present among spins 1 to n, but for brief description, the interactions are not illustrated. In the following, an interaction between a spin 0 and a spin i is indicated by $J_i$. Furthermore, an external magnetic field coefficient in the spin 0 is assumed to be $h_0$.

FIG. 12(B) illustrates the post-conversion Ising model. In the Ising model, a spin set is introduced, and the spin 0 is expressed with spins ($0_1$, and so forth up to $0_n$) of which the number is the same as the number of spins 1 to n that exert the interaction on the spin 0. Furthermore, in FIG. 12(B), the numbers of coefficients for interactions among spins $0_1$ to $0_n$ within the spin set and the spin 1 to n are assumed to be $b_1$, and so forth up to $b_{n-1}$ in this order, respectively and external magnetic field coefficients in the spins $0_1$ to $0_n$ are assumed to be $a_1$ and so forth up to $a_n$ in this order, respectively. An interaction between the spin set that represents the spin 0 in the post-conversion Ising model and the spin i is determined as $J_i$.

In the Ising model that is illustrated in FIG. 12(B), if it is considered that the Ising model is in the ground state, this is, a local optimal solution, values of spins $0_i$ and $0_{i+1}$ that are in the ground state when $|J_i|+|a_i|>|b_i|$ are equal to each other. Therefore, when the interaction is determined in such a manner that this inequality is satisfied, $0_1=0_2=\ldots=0_n$ is established in the ground state. Furthermore, when $a_1+a_2+\ldots+a_n=h_0$, in the pre-conversion and post-conversion ground states, values of the spin 0 and the spin $0_1$ are equal to each other. Consequently, each of interaction coefficients $J_1$ to $J_n$ and external magnetic field coefficients $a_1$ to $a_n$ are set in such a manner to satisfy these two conditions, and thus, a graph structure of the Ising model can be caused to be changed without causing the ground state to be changed.

In addition to the method described above, a method of determining a coefficient using a constant C that is defined in the following equation is also present.

[Equation 3]

$$C = \sum_{1 \leq i \leq n} |J_i| - |h_0| \quad (3)$$

Specifically, the post-conversion interaction coefficients $J_1$ to $J_n$ and the external magnetic field coefficients $a_1$ to $a_n$ are determined as follows, using the constant C.

[Equation 4]

$$a_i = \begin{cases} (|J_i| - C/2)\text{sign}(h_0) & (i = 1, N) \\ |J_i|\text{sign}(h_0) & (\text{otherwise}) \end{cases}, b_1 = b_2 = \ldots = b_{n-1} > C/2 \quad (4)$$

However, in Equation (4), sign(x) is a function that, when x is positive, results in +1 and that, when x is equal to or smaller to 0, results in −1. In this manner, when a coefficient is determined, pre-conversion and post-conversion ground states are equal to each other.

A value of each coefficient for the lattice Ising model when converting the Ising model in FIGS. 10(A) and 10(B) into the lattice Ising model that is illustrated in FIG. 11 without causing the ground state to be changed can be determined and be set by using any one of the methods described above.

(3-3) Method of Wiring Between the Ising Chips

Next, a method of wiring between the Ising chips 13 (FIG. 2) within the multi-Ising chip 6 that possibly expresses the lattice Ising model in question will be described.

When many spin units 40 (FIGS. 7 and 8) are set to be mounted in a single Ising chip 13, a chip size of the Ising chip 13 increases, and this leads to an increase in cost. For this reason, when many spin units 40 are mounted into the multi-Ising chip 6, a method in which a plurality of Ising chips 13, each of which has a scale that is not so large, are mounted in the multi-Ising chip 6 and thus these are connected to each other using inter-chip wiring is effective in reducing an increase in cost.

In this case, in order to perform wiring between the spin unit 40 that is provided on an end portion of the Ising chip 13, and the corresponding spin unit 40 within a different Ising chip 13, for example, as illustrated in FIG. 13, there is a need to connect the corresponding spin units 40 to chip ends, respectively, of the adjacent Ising chip 13, through a connection unit 50, which constitutes a portion of the inter-chip connection unit 24 (FIG. 3), and the inter-chip wiring 14. It is noted that "the spin unit 40 that is provided on the chip end portion" is a spin unit 40 that retains a value of an adjacent spin in the Ising model in FIG. 4 but refers to a spin unit 40 that is provided on a different Ising chip 13.

However, when forming the connection unit 50 or the inter-chip wiring 14 (FIG. 2) to connect all the corresponding spin units 40 that are provided on the chip ends, respectively, of the adjacent Ising chips 13, as illustrated in FIG. 13, because the number of the connection unit 50 or an amount of wiring of the inter-chip wiring 14 is too large, an increase in cost or the difficulty in mounting occurs.

On the other hand, FIG. 14 illustrates the lattice Ising model that results from converting the Ising model in which the number of spins is 6, using the conversion method that is described above with reference to FIGS. 10 and 11. In a case where a single Ising chip 13 does not have a number of spin units 40 necessary to express the entire lattice Ising model, as illustrated in FIG. 14, the lattice Ising model may be divided into a plurality of areas and pieces of data of these areas may be allocated to a plurality of Ising chips 13, respectively. In FIG. 14, an example is illustrated in which the lattice Ising model is divided into four areas, that is, areas AR1 to AR4, and in which pieces of data of the areas AR1 to AR4 are allocated (mapped) to an Ising chip 1 to an Ising chip 4, respectively.

At this time, between any areas in the X direction (more precisely, between the area AR1 that is expressed with the Ising chip 13 called "Ising chip 1" and the area AR2 that is expressed with the Ising chip 13 called "Ising chip 2", and between the area AR3 that is expressed with the Ising chip 13 called "Ising chip 3" and the area AR4 that is expressed with the Ising chip 13 called "Ising chip 4"), only an interaction within a front-side layer in the Z-axis direction is present.

For this reason, regarding being between the area AR1 and the area AR2, only an interaction between a spin that is positioned at (1, 1, 1) within the area AR1 and a spin that is positioned at (2, 1, 1) within the area AR2, and an interaction between a spin that is positioned at (1, 2, 1) within the area AR1 and a spin that is positioned at (2, 2, 1) within the area AR2 may be considered. Regarding being between the area AR3 and the area AR4, only an interaction between a spin that is positioned at (1, 3, 1) within the area AR3 and a spin that is positioned at (2, 3, 1) within the area AR4, and an interaction between a spin that is positioned at (1, 4, 1) within the area AR3 and a spin that is positioned at (2, 4, 1) within the area AR4 may be considered.

Therefore, when the lattice Ising model, as described in FIG. 14, is expressed with a plurality of Ising chips 13, regarding the Ising chip 13 called "Ising chip 1" and the Ising chip 13 called "Ising chip 2", a connection may be made at least between the spin unit 40 that expresses the spin which is positioned at (1, 1, 1) within the area AR1 and the spin unit 40 that expresses the spin which is positioned at (2, 1, 1) within the area AR2, and between the spin unit 40 that expresses the spin which is positioned at (1, 2, 1) within the area AR1 and the spin unit 40 that expresses the spin which is positioned at (2, 2, 1) within the area AR2.

Accordingly, in the case of the present embodiment, regarding the Ising chip 13 called "Ising chip 1", as illustrated in FIG. 15, among the spin units 40 that are provided on the end portions of the chips, which is adjacent to the Ising chip 13 called "Ising chip 2", the connection unit 50 is provided in a manner that is associated with one out of every two spin units 40 (include the spin unit 40 that expresses the spin which is positioned at (1, 2, 1) described above and the spin unit 40 that expresses the spin which is positioned at (1, 2, 1)).

Furthermore, regarding the Ising chip 13 called "Ising chip 2", among the spin units 40 that are provided on the end portions of the chips, which is adjacent to the Ising chip 13 called "Ising chip 1", the connection unit 50 is provided in a manner that is associated with one out of every two spin units 40 (include the spin unit 40 that expresses the spin which is positioned at (2, 1, 1) described above and the spin unit 40 that expresses the spin which is positioned at (2, 2, 1)).

Then, being between the Ising chips 13 called "Ising chip 1" and the Ising chip 13 called "Ising chip 2" includes being between the connection unit 50 that is connected to the spin unit 40 which expresses the spin that is positioned at (1, 2, 1) within the area AR1 and the connection unit 50 that is connected to the spin unit 40 which expresses the spin that is positioned at (2, 1, 1) within the area AR2, and being between the spin unit 40 that expresses the spin which is positioned at (1, 2, 1) within the area AR1, and the connection unit 50 that is connected to the spin unit 40 which expresses the spin that is positioned at (2, 2, 1) within the area AR2, and the connections units 50 that correspond to the Ising chip 13 called "Ising chip 1" and the Ising chip 13 called "Ising chip 2", respectively, are connected. Accordingly, in the present embodiment, the number of wiring lines between the Ising chip 13 called "Ising chip 1" and the Ising chip 13 called "Ising chip 2" can be reduced when compared with that in FIG. 13.

In the same manner, in the case of the present embodiment, regarding the Ising chip 13 called "Ising chip 3", among the spin units 40 that are provided on the end portions of the chips, which is adjacent to the Ising chip 13 called "Ising chip 4", the connection unit 50 is provided in a manner that is associated with one out of every two spin units 40 (include the spin unit 40 that expresses the spin which is positioned at (1, 3, 1) described above and the spin unit 40 that expresses the spin which is positioned at (1, 4, 1)).

Furthermore, regarding the Ising chip 13 called "Ising chip 4", among the spin units 40 that are provided on the end portions of the chips, which is adjacent to the Ising chip 13 called "Ising chip 3", the connection unit 50 is provided in a manner that is associated with one out of every two spin units 40 (include the spin unit 40 that expresses the spin which is positioned at (2, 3, 1) described above and the spin unit 40 that expresses the spin which is positioned at (2, 4, 1)).

Then, being between the Ising chips 13 called "Ising chip 3" and the Ising chip 13 called "Ising chip 4" includes being between the connection unit 50 that is connected to the spin unit 40 which expresses the spin that is positioned at (1, 3, 1) within the area AR3 and the connection unit 50 that is connected to the spin unit 40 which expresses the spin that is positioned at (2, 3, 1) within the area AR4, and being between the spin unit 40 that expresses the spin which is positioned at (1, 4, 1) within the area AR3, and the connection unit 50 that is connected to the spin unit 40 which expresses the spin that is positioned at (2, 4, 1) within the area AR4, and the connections units 50 that correspond to the Ising chip 13 called "Ising chip 3" and the Ising chip 13 called "Ising chip 4", respectively, are connected. Accordingly, in the present embodiment, the number of wiring lines between the Ising chip 13 called "Ising chip 3" and the Ising chip 13 called "Ising chip 4" can be reduced when compared with that in FIG. 13.

On the other hand, between any areas in the Y direction (between the area AR1 and the area AR3 and between the area AR2 and the area AR4), only an interaction within the rear-side layer in the Z-axis direction is present.

For this reason, regarding being between the area AR1 and the area AR3, only an interaction between a spin that is positioned at (0, 2, 0) within the area AR1 and a spin that is positioned at (0, 3, 0) within the area AR3, and an interaction between a spin that is positioned at (1, 2, 0) within the area AR1 and a spin that is positioned at (1, 3, 0) within the area AR3 may be considered. Regarding being tween the area AR2 and the area 4, only an interaction between a spin that is positioned at (2, 2, 0) within the area AR2 and a spin that is positioned at (2, 3, 0) within the area AR4, and an interaction between a spin that is positioned at (3, 2, 0) within the area AR2 and a spin that is positioned at (3, 3, 0) within the area 4 may be considered.

Therefore, when the lattice Ising model, as described in FIG. 14, is expressed with a plurality of Ising chips 13, regarding the Ising chip 13 called "Ising chip 1" and the Ising chip 13 called "Ising chip 3", a connection may be made at least between the spin unit 40 that expresses the spin which is positioned at (0, 2, 0) within the area AR1 and the spin unit 40 that expresses the spin which is positioned at (0, 3, 0) within the area AR3, and between the spin unit 40 that expresses the spin which is positioned at (1, 2, 0) within the area AR1 and the spin unit 40 that expresses the spin which is positioned at (1, 3, 0) within the area AR3.

Accordingly, in the case of the present embodiment, regarding the Ising chip 13 called "Ising chip 1", as illustrated in FIG. 17, among the spin units 40 that are provided on the end portions of the chips, which is adjacent to the Ising chip 13 called "Ising chip 3", the connection unit 50 is provided in a manner that is associated with one out of every two spin units 40 (include the spin unit 40 that expresses the spin which is positioned at (0, 2, 0) described above and the spin unit 40 that expresses the spin which is positioned at (1, 2, 0)).

Furthermore, regarding the Ising chip 13 called "Ising chip 3", among the spin units 40 that are provided on the end portions of the chips, which is adjacent to the Ising chip 13 called "Ising chip 1", the connection unit 50 is provided in a manner that is associated with one out of every two spin units 40 (include the spin unit 40 that expresses the spin which is positioned at (0, 3, 0) described above and the spin unit 40 that expresses the spin which is positioned at (1, 3, 0)).

Then, being between the Ising chips 13 called "Ising chip 1" and the Ising chip 13 called "Ising chip 3" includes being between the connection unit 50 that is connected to the spin unit 40 which expresses the spin that is positioned at (0, 2, 0) within the area AR1 and the connection unit 50 that is connected to the spin unit 40 which expresses the spin that is positioned at (0, 3, 0) within the area AR3, and being between the spin unit 40 that expresses the spin which is positioned at (1, 2, 0) within the area AR1, and the connection unit 50 that is connected to the spin unit 40 which expresses the spin that is positioned at (1, 3, 0) within the area AR3, and the connections units 50 that correspond to the Ising chip 13 called "Ising chip 1" and the Ising chip 13 called "Ising chip 3", respectively, are connected. Accordingly, in the present embodiment, the number of wiring lines between the Ising chip 13 called "Ising chip 1" and the Ising chip 13 called "Ising chip 3" Can be reduced when compared with that in FIG. 13.

In the same manner, in the case of the present embodiment, regarding the Ising chip 13 called "Ising chip 2", among the spin units 40 that are provided on the end portions of the chips, which is adjacent to the Ising chip 13 called "Ising chip 4", the connection unit 50 is provided in a manner that is associated with one out of every two spin units 40 (include the spin unit 40 that expresses the spin which is positioned at (2, 2, 0) described above and the spin unit 40 that expresses the spin which is positioned at (3, 2, 0)).

Furthermore, regarding the Ising chip 13 called "Ising chip 4", among the spin units 40 that are provided on the end portions of the chips, which is adjacent to the Ising chip 13 called "Ising chip 3", the connection unit 50 is provided in a manner that is associated with one out of every two spin units 40 (include the spin unit 40 that expresses the spin which is positioned at (2, 3, 0) described above and the spin unit 40 that expresses the spin which is positioned at (3, 3, 0)).

Then, being between the Ising chips 13 called "Ising chip 2" and the Ising chip 13 called "Ising chip 4" includes being between the connection unit 50 that is connected to the spin unit 40 which expresses the spin that is positioned at (2, 2, 0) within the area AR2 and the connection unit 50 that is connected to the spin unit 40 which expresses the spin that is positioned at (2, 3, 0) within the area AR4, and being between the connection unit 50 that is connected to the spin unit 40 which expresses the spin which is positioned at (3, 2, 0) within the area AR2, and the connection unit 50 that is connected to the spin unit 40 which expresses the spin that is positioned at (3, 3, 0) within the area AR4, and the connections units 50 that correspond to the Ising chip 13 called "Ising chip 2" and the Ising chip 13 called "Ising chip 4", respectively, are connected. Accordingly, in the present embodiment, the number of wiring lines between the Ising chip 13 called "Ising chip 2" and the Ising chip 13 called "Ising chip 4" Can be reduced when compared with that in FIG. 13.

It is noted that connection relationships among the Icing chips 13 in the multi-Ising chip 6, which results from combing FIGS. 15 and 16, are illustrated in FIG. 17. It is noted that in FIG. 17, in order to avoid the drawings' being complicated, connection relationships among three Ising chips 13 called "Ising chip 1" to "Ising chip 3" are illustrated, and the Ising chip 13 called "Ising chip 4" is omitted. The connections among the Ising chips 13 are made in this manner in the multi-Ishing chip 6, and thus the wiring among the Ising chips 13 can be reduced to ½ when compared with that in FIG. 13.

(3-4) Control Procedure for the Ising Chip

FIG. 18 illustrates a processing procedure for a ground state search processing that is performed by the CPU 3 (FIG. 1) in the present information processing apparatus 1. The CPU 3 controls Ising chips 13 within the multi-Ising chip 6 through the controller 15 (FIG. 2) of the necessary multi-Ising chip 6 (FIG. 2), based on the problem conversion program 8 (FIG. 1) in Step SP1, and based on the multi-Ising chip control program 9 (FIG. 1) in subsequent processing (Step SP2 to Step SP13), and thus causes the search for the ground state to be made in these Ising chips 13. It is noted that processing in Step SP1 and processing in Step SP2 to Step SP13 may be performed at different timings.

Furthermore, the CPU 3 controls the Ising chip 13 within each multi-Ising chip 6 or the spin unit 40 within the Ising chip 13 through the controller 15 (FIG. 2) within the multi-Ising chip 6, but in the following, for easy understanding, a description is provided with the presence of the controller 15 being ignored.

When starting the ground state search processing according to an instruction or the like from a user, the CPU 3 first converts the problem data 7 (FIG. 1) into data in the form of the lattice Ising model that is described above with reference to FIG. 11 (SP 1).

Subsequently, the CPU 3 sets the interaction coefficient for the post-conversion lattice Ising model and the external magnetic field coefficient, for each spin unit 40 within each Ising chip 13 of the necessary multi-Ising chip 6 (SP 2).

Subsequently, the CPU 3 determines a value of the spin that has to be retained in each spin unit, using a random number, and initializes a value of the spin in each spin unit 40 within each Ising chip 13 in the multi-Ising chip 6 in question in such a manner that the value of the spin is the determined value of the spin (SP3).

Moreover, the CPU 3 sets a probability (hereinafter called a bit probability) that "1" will appear in the random number in that is generated by the random number generator 17 (FIG. 2) within each multi-Ising chip 6, which is determined in advance (SP4). In the case of the present embodiment, at the time of the initialization, the bit probability is set to be high in the random number that is generated by the random number generator 17, and thereafter, gradually decreases the bit probability. Accordingly, whereas at the time of the initialization, it is easy to invert a value of a spin that is retained in each spin unit 40, it can thereafter be difficult to gradually invert the value of the spin (it is easy for the value to converge on "0" or "1"). For this reason, in Step SP4, the bit probability is set in each phase described above.

Moreover, the CPU 3 sets the number of times that interaction computation is performed for each bit probability that is determined in advance (SP5), and thereafter resets a counter (set a counter value to "0") within each connection unit 50 (FIGS. 13 to 15) in each Ising chip 13 (SP6) to synchronize timings among the Ishing chip 13.

Subsequently, the CPU 3 drives the interaction clock generator 16 (FIG. 2) of the multi-Ising chip 6 and so forth, and thus causes the interaction computation to be performed one time in each spin unit 40 with each Ising chip 13 (SP7), and thereafter determines whether or not the interaction computation is performed as many times as is set based on a current bit probability and is ended (SP8). Then, when obtaining a negative result of the determination, the CPU 3 returns to Step 527, and thereafter repeats the processing in Step SP7 and the processing in Step SP8.

Then, the CPU 3 can perform the interaction computation as many times as is set based on the bit probability that is almost currently set, and thus when obtaining a positive result in Step SP8, determines whether or not the interaction computation for each bit probability that is set in Step SP5 is all performed and is ended (SP9).

When obtaining the negative result of the determination, the CPU 3 updates the bit probability to the bit probability determined in advance to be lower than a current bit probability (SP10), and thereafter, updates the number of times of the interaction computation that has to be performed to the number of times that is determined in advance for the bit probability (SP11). Then, the CPU 3 returns to Step SP7, and thereafter repeats processing in each of Step SP7 to Step SP11.

Then, when all performing and ending the interaction computation for each bit probability that is already set in Step SP5, and then obtaining the positive result in Step SP9, the CPU 3 reads a value of a spin that is retained in each spin unit 40 within each Ising chip 13 in the multi-Ising chip 6 that is a target at that time (SP12).

Furthermore, the CPU 3 collate data representing a correspondence relationship between the spin unit that is stored in the memory 4 and the original Ising model and determines a value of each spin in the original Ising model, from the spin value that is read (SP13).

If the ground state is obtained with the calculation described above, all spins that are included within each spin set have the same value (for example, all values of the spins 1 in FIG. 11 are the same). This is secured by setting a coefficient by the processing described above. Therefore, in this case, a value of a spin is read one by one from each spin set, and thus a value of each spin in the original Ising model is determined.

However, the ground state of the isina model is not necessarily obtained by the ground state search processing so far. Then, in the case, there is a likelihood that all spins within the spin set will not have the same value. Accordingly, in this case, a value of a spin in a set that has many spins, among spin sets, is selected and thus, a value of the corresponding spin in the original Ising model is determined. Furthermore, if the tendency to easily reach a value of the ground state varies from one spin to another, a weighting is assigned according to the tendency and thus the majority determination in question may be performed.

Then, the CPU 3 thereafter ends the ground state search processing.

FIG. 19 illustrates detail of specific processing by the CPU 3 in SP1 in FIG. 18. It is noted the in the case of the present embodiment, the problem data 7 is stored, in a format that is illustrated on the left side of FIG. 20(A), in the memory 4 (FIG. 1). In FIG. 20(A), the first and second positions in each row indicate a spin and the third position indicates an inter-spin interaction coefficient. Furthermore, if a row, spins at whose first and second positions are equal to each other, is present, the third position in the row indicates an external magnetic field coefficient of each of these spins.

The CPU 3 first inputs the problem data 7 (SP20). Then, in a case where the ground state of the Ising model is searched for using a plurality of Ising chips 13 and where the problem data 7, which is input, has a graph structure which has a point at which there is no interaction as illustrated in FIG. 10(A), the CPU 3 sets a coefficient of the point to "0", and converts the problem data into intermediate data (the right side of FIG. 20(A)) that represents an Ising model as the complete graph as illustrated in FIG. 10(B) (SP21).

Then, the CPU 3 converts the intermediate data that is obtained in Step SP20 into output data as illustrated on the left side of FIG. 20(B) that illustrates the lattice Ising model which is described above with reference to FIG. 11 (SP22). The output data that is obtained by this conversion is expressed, for example, in the same format as the problem data 7.

Subsequently, the CPU 3 divides the output data that is obtained in Step SP22, for an Ising model of which a scale is as large as is possibly expressed by the multi-Ising chip 6 (FIG. 1), whenever necessary (SP23).

Then, the CPU 3 records the output data in the memory 4 (SP24). Furthermore, in conversion processing in Step SP22, an approach, such as the spin set, is used. Because of this, one spin in the original Ising model is expressed as a plurality of spins in an Ising model that is represented by the output data. Accordingly, the CPU 3 records data on the right side of FIG. 20(B), which indicates which spin corresponds to a spin of the original Ising model in the lattice Ising model that is represented by the output data which is obtained in step S22, in the memory 4 as well (SP24). It is noted that on the right side of FIG. 20(B), it is illustrated that the spin 1 of the original Ising model is equivalent to the spins 1 to 5 in the post-conversion Ising model.

Moreover, the CPU 3 sets an interaction coefficient for the partial problem that is obtained by dividing the post-conversion problem when necessary in Step SP24, and an external magnetic field coefficient, for each spin unit 40 within each Ising chip 13 of the necessary multi-Ising chip 6 (SP24), and thereafter ends the processing in FIG. 19 and returns to the ground state search processing in FIG. 18.

(3-5) Conversion into Three- or More-Layered Lattice Ising Model

The method of converting an arbitrary Ising model into the Ising model that has the two-layered lattice graph is described above. By arranging the spin sets like this, it is possible to spatially perform conversion for the multi-Ising chip 6 that possibly expresses a three- or more-layered lattice graph, with high efficiency.

FIG. 21 illustrates an example of a case in which a complete graph in which the number of spins is 7 is expressed using the spin set, for the multi-Ising chip 6 that possibly expresses the lattice Ising model which is made up of a three-layered lattice graph. In the following, in FIG. 21, an upper left spin on a rear-side layer in the Z-axis direction is assumed to be at the origin (coordinates (0, 0, 0)), X coordinates of spins that are adjacent, sequentially in the X-axis direction, to this spin are assumed to be 1, 2, and so forth, respectively, Y coordinates of spins that are adjacent, sequentially in the Y-axis direction, to the spin at the origin are assumed to be 1, 2, and so forth, respectively, and a Z coordinate of a front-side layer in the Z-axis direction is assumed to 1.

In the lattice Ising model that is illustrated in FIG. 21, a spin arrangement in the rearmost-side layer (a layer of which a Z coordinate is "0") in the Z-axis direction and an intermediate layer (a layer of which a Z coordinate is "1") the Z-axis direction is the same as in the two-layered lattice Ising model that is described above with reference to FIG. 11.

Then, in the front-side layer (a layer of which a Z coordinate is "2"), a spin "7" is positioned at each of positions (0, 0, 2), (0, 1, 2), (0, 2, 2), (0, 3, 2), and (0, 4, 2) and at a position (1, 4, 2).

In FIG. 21, as in FIG. 11, a side that links between spins that exert the interaction is indicated with a bold line, and a side that links between spins that do not exert the interaction is indicated with a fine line. More precisely, in the lattice Ising model in FIG. 21, only spins that are adjacent to each other in the Y-axis direction exert the interaction, in the rearmost-side layer in the Z-axis direction, only spins that are adjacent to each other in the X-axis direction exert the interaction, in the intermediate layer in the Z-axis direction, spins that are adjacent to each other in the X-axis direction or in the Y-axis direction exert the interaction, in the front-side layer in the Z-axis direction, and spins that are adjacent to each other in the Z-axis direction exert the interaction, between each of the rear-side layer in the Z-axis direction, the intermediate layer, and the front-side layer.

(4) Effects of the Present Embodiment

As described above, in the information processing apparatus 1 according to the present embodiment, the problem data 7 is converted into the data of the stepwise lattice Ising model that is possible expressed by a plurality of Ising chips 13, in such a manner that the spin arrangement of the ground state of the Ising model for the problem is not caused to be changed, and the data of the lattice Ising model is divided for allocation to each Ising chip 13. Thus, the search for the ground state of an arbitrary Ising model can be made. Furthermore, among spins of which values are retained in a certain Ising chip 13, the number of spins that exert the interaction on a spin of which a value is retained in a different semiconductor chip can be reduced. Because of this, as a result, an amount of wiring of the inter-chip wiring that connects among the Ising chips 13 can be reduced. Thus, an information processing apparatus that can be manufactured at a low cost with ease and that is capable of making a search for the ground state of an arbitrary Ising model can be realized.

(5) Other Embodiments

It is noted that in the embodiment, the case where the Ising model that is a problem is set to be converted into the lattice Ising model in the form which is described above with reference to FIGS. 11 and 21 is described above, but the present invention is not limited to this, and that, if the Ising model that is the problem is converted into the lattice Ising model that is possibly expressed by a plurality of Ising chips 13 without causing the spin arrangement of the ground state thereof to be changed, other various forms can be broadly applied as forms of the lattice Ising model.

In the embodiment, the case where, among the spin units 40 that are provided on the end portions of the Ising chips 13, the connection unit 50 is provided, as the method of wiring among the Ising chips 13, in a manner that is associated with one out of every two spin units 40 and those connection units 50 are set to be connected to corresponding connection units 50, respectively, of other Ising chips 13 is described above, but the present invention is not limited to this. Among the spin units 40 within the Ising chips 13, the connection unit 50 may be provided in a manner that is associated only with a spin unit 40 on which a spin unit 40 within other Ising chips 13 exerts an interaction with a spin that retains a value, and those connection unit 50 may be connected to corresponding connection units 50, respectively, of other Ising chips 13. By doing this, an amount of wiring among the Ising chips 13 can be reduced much more.

The present invention can find wide application in semiconductor device that makes a search for a ground state of an Ising model.

REFERENCE SIGNS LIST 1 information processing apparatus
3 CPU
6 multi-Ising chip
7 problem data
8 problem conversion program
9 multi-Ising chip control program
13 Ising chip
14 inter-chip wiring
20 spin array
24 inter-chip connection unit
40 spin unit
50 connection unit

The invention claimed is:

1. An information processing apparatus that calculates a certain ground state in a spin arrangement which minimizes energy of a certain problem in an Ising model, or a solution approximate to the ground state, as a solution to the problem, the apparatus comprising:
a plurality of semiconductor chips, each of which retains a value of one spin or values of a plurality of spins and simulates interactions among the spins;
inter-chip wiring that connects between each of the necessary semiconductor chips; and
a processor that controls each of the semiconductor chips and thus causes the each of the semiconductor chips to perform interaction computation,
wherein the processor converts data of the problem into data of a lattice-shaped Ising model, which is expressed by the plurality of semiconductor chips, without causing the spin arrangement in the ground state of the Ising model for the problem, to be changed, and divides the data of the lattice-shaped Ising model, which results from the conversion, for allocation to each of the plurality of semiconductor chips,
wherein the processor replaces first spins of the Ising model for the problem, with sets of third spins, respectively, of which the number is the same as the number of second spins that exert interactions on the first spins, and the sets of third spins are arranged in such a manner that the lattice-shaped Ising model as a whole is stepwise, and converts the data of the problem into the data of the lattice-shaped Ising model, and wherein, on the assumption that an interaction coefficient between the i-th second spin and the i-th third spin that corresponds to the second spin is $J_i$, an external magnetic field coefficient in the i-th third spin is $a_i$, an interaction coefficient between the i-th third spin and the (i+1)-th third spin is $b_i$, the number of second spins is n, and an external magnetic field coefficient in the first spin that corresponds to the third spin is $h_0$, the processor sets each interaction coefficient and each external magnetic field coefficient of the lattice-shaped Ising model in such a manner that the following equations are satisfied:

[Equation 5]

$$|J_i| + |a_i| > |b_i| \quad (5)$$

and

[Equation 6]

$$a_2 + a_2 + \ldots + a_a = h_0 \quad (6)$$

2. The information processing apparatus according to claim 1,
wherein the processor converts the data of the problem into intermediate data that represents the Ising model as a complete graph, and converts the intermediate data to the data of the lattice-shaped Ising model.

3. The information processing apparatus according to claim 1,
wherein, on the assumption that an interaction coefficient between the i-th second spin and the i-th third spin that corresponds to the second spin is $J_i$, an external magnetic field coefficient in the i-th third spin is $a_i$, an interaction coefficient between the i-th third spin and the (i+1)-th third spin is $b_i$, the number of second spins is n, and an external magnetic field coefficient in the first spin that corresponds to the third spin is $h_0$, the processor uses a constant C that is defined in the following equation:

[Equation 7]

$$C = \sum_{1 \leq i \leq n} |J_i| - |h_0| \quad (7)$$

in order to set the interaction coefficient $j_i$ and the external magnetic field coefficient $a_i$ for the i-th third spin in such a manner that the following equation is satisfied:

[Equation 8]

$$a_i = \begin{cases} (|J_i| - C/2)\text{sign}(h_0) & (i=1, N) \\ |J_i| \text{sign}(h_0) & (\text{otherwise}) \end{cases}, b_1 = b_2 = \ldots = b_{n-1} > C/2 \quad (8)$$

where sign(x) is a function in which when x is positive, the result is +1 and in which when x is equal to or smaller than 0, the result is −1.

4. The information processing apparatus according to claim 1,
wherein the processor determines a same value as a value of the first spin, in a case where after the interaction computation is ended, all the third spins that correspond to the same first spin have the same value, and, determines a value of a spin in a set of a plurality of spins, as the value of the first spin, in a case where after the interaction computation is ended, all the third spins that correspond to the same first spin do not have the same value.

5. A method of controlling an information processing apparatus that calculates a certain ground state in a spin arrangement which minimizes energy of a certain problem in an Ising model, or a solution approximate to the ground state, as a solution to the problem, the apparatus including
   a plurality of semiconductor chips, each of which retains a value of one spin or values of a plurality of spins and simulates interactions among the spins,
   inter-chip wiring that connects between each of the necessary semiconductor chips, and
   a processor that controls each of the semiconductor chips and thus causes the each of the semiconductor chips to perform interaction computation, the method comprising:
   a first step of causing the processor to convert data of the problem into data of a lattice-shaped Ising model, which is expressed by the plurality of semiconductor chips, without causing the spin arrangement in the ground state of the Ising model for the problem, to be changed;
   a second step of causing the processor to divide the data of the lattice-shaped Ising model, which results from the conversion, for allocation to each of the plurality of semiconductor chips; and
   a third step of causing the processor to cause each of the semiconductor chips to perform the interaction computation,
   wherein in the first step, the processor replaces first spins of the Ising model, which is the problem, with sets of third spins, respectively, of which the number is the same as the number of second spins that exert interactions on the first spins, arranges the sets of third spins in such a manner that the lattice-shaped Ising model as a whole is stepwise, and converts the data of the problem into the data of the lattice-shaped Ising model, and
   wherein in the first step, on the assumption that an interaction coefficient between the i-th second spin and the i-th third spin that corresponds to the second spin is $j_i$, an external magnetic field coefficient in the i-th third spin is $a_i$, an interaction coefficient between the i-th third spin and the (i+1)-th third spin is $b_i$, the number of second spins is n, and an external magnetic field coefficient in the first spin that correspond to the third spin is $h_0$, the processor sets each interaction coefficient and each external magnetic field coefficient of the lattice-shaped Ising model in such a manner that the following equations are satisfied:

[Equation 9]

$$|J_i|+|a_i|>|b_i| \qquad (9)$$

and

[Equation 10]

$$a_1+a_2+\ldots+a_n=h_0 \qquad (10)$$

6. The method of controlling an information processing apparatus according to claim 5,
   wherein in the first step, the processor converts the data of the problem into intermediate data that represents the Ising model as a complete graph, and converts the intermediate data to the data of the lattice-shaped Ising model.

7. The method of controlling an information processing apparatus according to claim 5,
   wherein in the first step, on the assumption that an interaction coefficient between the i-th second spin and the i-th third spin that corresponds to the second spin is $j_i$, an external magnetic field coefficient in the i-th third spin is $a_i$, an interaction coefficient between the i-th third spin and the (i+1)-th third spin is $b_i$, the number of second spins is n, and an external magnetic field coefficient in the first spin that corresponds to the third spin is $h_0$, the processor uses a constant C that is defined in the following equation:

[Equation 11]

$$C = \sum_{1 \leq i \leq n} |J_i| - |h_0| \qquad (11)$$

in order to set the interaction coefficient $j_i$ and the external magnetic field coefficient $a_i$ for the i-th third spin in such a manner that the following equation is satisfied:

[Equation 12]

$$a_i = \begin{cases} (|J_i|-C/2)\mathrm{sign}(h_0) & (i=1, N) \\ |J_i|\,\mathrm{sign}(h_0) & (\text{otherwise}) \end{cases}, \; b_1=b_2=\ldots=b_{n-1}>C/2 \qquad (12)$$

where sign(x) is a function in which when x is positive, the result is +1 and in which when x is equal to or smaller than 0, the result is −1.

8. The method of controlling an information processing apparatus according to claim 5,
   wherein in the third step, the processor determines a same value as a value of the first spin, in a case where after the interaction computation is ended, all the third spins that correspond to the same first spin have the same value, and, determines a value of a spin in a set of a plurality of spins, as the value of the first spin, in a case where after the interaction computation is ended, all the third spins that correspond to the same first spin do not have the same value.

* * * * *